(12) United States Patent
Suwabe et al.

(10) Patent No.: US 8,144,211 B2
(45) Date of Patent: Mar. 27, 2012

(54) CHROMATIC ABERRATION CORRECTION APPARATUS, IMAGE PICKUP APPARATUS, CHROMATIC ABERRATION AMOUNT CALCULATION METHOD, AND CHROMATIC ABERRATION AMOUNT CALCULATION PROGRAM

(75) Inventors: Kaoru Suwabe, Kanagawa (JP); Kenichi Sanpei, Chiba (JP)

(73) Assignee: Sony Corporation (JP)

( * ) Notice: Subject to any disclaimer, the term of this patent is extended or adjusted under 35 U.S.C. 154(b) by 434 days.

(21) Appl. No.: 12/316,630

(22) Filed: Dec. 15, 2008

(65) Prior Publication Data

US 2009/0153696 A1    Jun. 18, 2009

(30) Foreign Application Priority Data

Dec. 17, 2007    (JP) .............................. P2007-324236

(51) Int. Cl.
*H04N 9/73* (2006.01)
*H04N 5/228* (2006.01)
*G06K 9/00* (2006.01)

(52) U.S. Cl. .................. 348/223.1; 348/222.1; 382/167

(58) Field of Classification Search .................. None
See application file for complete search history.

(56) References Cited

U.S. PATENT DOCUMENTS

| 7,577,292 | B2 * | 8/2009 | Kang ............................. 382/167 |
| 7,583,301 | B2 * | 9/2009 | Sakurai et al. ................. 348/241 |
| 2005/0219363 | A1 * | 10/2005 | Kohler et al. ................. 348/187 |
| 2006/0098253 | A1 * | 5/2006 | Masuno et al. ............... 358/518 |
| 2007/0103564 | A1 * | 5/2007 | Chiba .......................... 348/223.1 |
| 2007/0153341 | A1 * | 7/2007 | Kang ............................. 358/529 |
| 2008/0137947 | A1 * | 6/2008 | Sawada et al. ............... 382/167 |
| 2008/0144023 | A1 * | 6/2008 | Shibata et al. ............. 356/237.2 |
| 2008/0170248 | A1 * | 7/2008 | Kang et al. ..................... 358/1.9 |
| 2009/0052769 | A1 * | 2/2009 | Kang et al. ..................... 382/162 |
| 2009/0129696 | A1 * | 5/2009 | Komatsu et al. ............... 382/264 |
| 2011/0268357 | A1 * | 11/2011 | Sawada et al. ................ 382/167 |

FOREIGN PATENT DOCUMENTS

JP    2007-133591 A    5/2007

* cited by examiner

*Primary Examiner* — Lin Ye
*Assistant Examiner* — John H Morehead, III
(74) *Attorney, Agent, or Firm* — Lerner, David, Littenberg, Krumholz & Mentlik, LLP

(57) ABSTRACT

The invention relates to a chromatic aberration correction apparatus. A judgment unit judges whether a selected pixel of interest is a white overexposure pixel or not on the basis of white overexposure pixel distribution information that is held in a white overexposure distribution information memory. A white overexposure pixel judgment is made for each of pixels that make up an image. A reader reads, for each selected pixel of interest that is judged as a white overexposure pixel by the judgment unit, chromatic aberration amount distribution information for a certain area that is determined on the basis of the selected pixel of interest out of a chromatic aberration distribution information memory. An adder adds each chromatic aberration amount contained in the chromatic aberration amount distribution information that is read by the reader to a value of the corresponding position in the storage area of a chromatic aberration amount memory.

11 Claims, 11 Drawing Sheets

FIG. 4

$$S = \sum_{y=0}^{n} \sum_{x=0}^{m} M_{xy} \times W_{xy} \quad \cdots (1)$$

S : CHROMATIC ABERRATION AMOUNT OF A CERTAIN PIXEL OF INTEREST x, y : POSITION IN SEARCH AREA SURROUNDING THE PIXEL OF INTEREST, THE SEARCH AREA BEING DEFINED AS m × n PIXELS
(THE PIXEL OF INTEREST IS THE CENTER OF THE m × n PIXELS)

$M_{xy}$ : CHROMATIC ABERRATION CORRECTION VALUE FOR EACH OF POSITIONS x, y ON CHROMATIC ABERRATION MAP $W_{xy}$ : WHITE OVEREXPOSURE PRESENCE/ABSENCE INFORMATION FOR EACH OF POSITIONS x, y ON WHITE OVEREXPOSURE MAP
(e.g., 1: WHITE OVEREXPOSURE PIXEL, 0: NON-WHITE-OVEREXPOSURE PIXEL)

FIG. 5

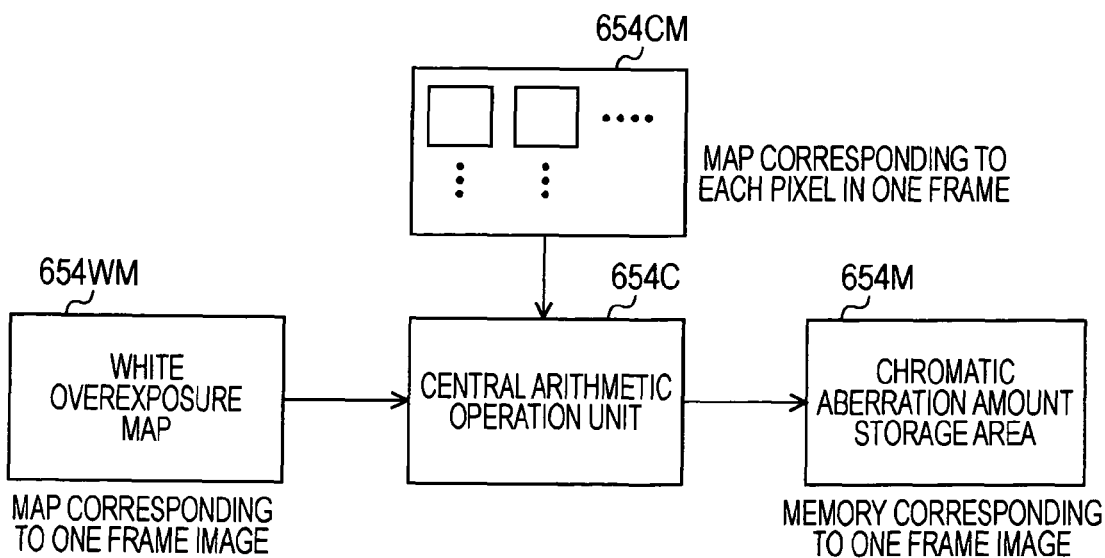

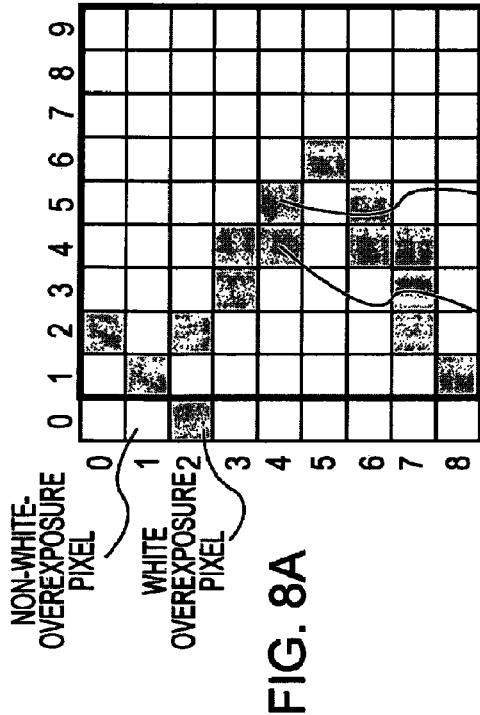

CHROMATIC ABERRATION AMOUNTS OF
THE PIXEL OF INTEREST (LOCATED AT x-y POSITION [4, 4])
CHROMATIC ABERRATION AMOUNT
S = A2 + B3 + C4 + C2 + D1 + D0 + E0 + E1 + D2 + C0 + C1 + B2 + B1 + B0 + A3

CHROMATIC ABERRATION CORRECTION APPARATUS, IMAGE PICKUP APPARATUS, CHROMATIC ABERRATION AMOUNT CALCULATION METHOD, AND CHROMATIC ABERRATION AMOUNT CALCULATION PROGRAM

CROSS REFERENCES TO RELATED APPLICATIONS

The present application claims priority from Japanese Patent Application No. JP 2007-324236, filed in the Japanese Patent Office on Dec. 17, 2007, the entire content of which is incorporated herein by reference.

BACKGROUND OF THE INVENTION

1. Field of the Invention

The present invention relates to an apparatus for processing images such as a digital still camera, a digital video camera, and the like. In addition, the invention further relates to an apparatus, a method, and a program that can be suitably used in such an image processing apparatus for the purpose of correcting the chromatic aberration of an image.

2. Description of the Related Art

Various kinds of electronic cameras are widely used nowadays. Some examples of such a variety of electronic cameras are: a digital still camera, a digital video camera, and a camera module that is mounted on or built in a variety of handheld electronic devices such as a mobile phone terminal and the like. These days, there is a demand for a small electronic camera that provides high magnification with a large number of pixels. In addition, there is also a need for high image quality.

However, it is getting more and more difficult to manufacture a lens that has a sufficiently high modulation transfer function (MTF) that can meet such an increasing demand for a smaller size, higher magnification, and a larger number of pixels. For example, as the size of a lens is reduced, the problem of "aberration" arises. Aberration is an undesirable difference in the focal positions of a formed image that is attributable to different wavelengths of light or screen positions. Besides the aberration problem, there arise a variety of image problems such as "shading" and "distortion". Shading is an image problem of greater attenuation in the amount of incident light at the edge of a screen. Distortion is an image problem that arises depending on the position of an image on a screen.

One of such a variety of image problems that are attributable to a lens is aberration, or, more specifically, chromatic aberration. In connection therewith, a technique for correcting chromatic aberration through signal processing is described in Japanese Unexamined Patent Application Publication No. 2007-133591. According to the related-art chromatic aberration correction technique described in Japanese Unexamined Patent Application Publication No. 2007-133591, a judgment is made for each of pixels that make up an image as to whether a judgment-target pixel is a white overexposure pixel or not on the basis of the signal level of a luminance signal. Then, the result of judgment is stored as white overexposure information. A white overexposure map, which indicates the distribution of peripheral white overexposure pixels around a certain pixel of interest, is created on the basis of the stored white overexposure information. The created white overexposure map is stored for subsequent referential use. Then, according to the above-identified chromatic aberration correction technique of the related art, the integral value of the chromatic aberration amount of a certain pixel of interest as affected from its peripheral white overexposure pixels is calculated with the use of the white overexposure map that is stored as explained above and a pre-created chromatic aberration map, which indicates the distribution of chromatic aberration amount. Chromatic aberration correction is appropriately controlled by means of the calculated integral value of the chromatic aberration amount thereof.

SUMMARY OF THE INVENTION

In the related-art chromatic aberration correction technique described in Japanese Unexamined Patent Application Publication No. 2007-133591, the chromatic aberration amount of a certain pixel of interest is calculated as follows. On the basis of the white overexposure map that is stored as explained above and further on the basis of the pre-created chromatic aberration map, which corresponds to information related to the amount of correction for chromatic aberration (i.e., chromatic aberration amount) for pixels located in the neighborhood of a certain pixel of interest, if there is any white overexposure pixel in a search area surrounding the pixel of interest, including the position thereof, a value for chromatic aberration correction is taken out of the chromatic aberration map for each white overexposure pixel that is present therein. Then, the taken-out values for chromatic aberration correction are integrated so as to obtain the chromatic aberration amount of the pixel of interest.

The amount of arithmetic operation that is necessary for calculating chromatic aberration amount is significantly large. For example, it is assumed herein that chromatic aberration amount is calculated for an image having the number of pixels of 200×150. Herein, a white overexposure search area around a pixel of interest is assumed to be made up of 9×9 pixels. It is further assumed herein that white overexposure percentage, which shows the ratio of the number of white overexposure pixels to the number of all pixels, is 10%.

Under these assumptions, for the calculation of the chromatic aberration amount of a certain pixel of interest, that is, one pixel of interest, it is necessary to make a white overexposure judgment for each of all pixels that are located in the white overexposure search area, which is a 9×9 pixel area determined on the basis of the pixel of interest. Therefore, it is necessary to perform white overexposure judgment operations 81 times in order to calculate the chromatic aberration amount of one pixel of interest. In addition, assuming that ten percent of these 9×9 pixels located in the white overexposure search area are affected by white overexposure, which are 8.1 pixels, the number of chromatic aberration correction values that need to be summed up, that is, integrated, for the calculation of the chromatic aberration amount of one pixel of interest is 8.1. That is, the number of times of addition of chromatic aberration correction values that should be performed for the calculation of the chromatic aberration amount of one pixel of interest is 8.1 times.

Since the arithmetic operation explained above is performed for each of pixels that make up an image, that is, 200×150 pixels, the number of times of white overexposure judgment operation, that is, white overexposure comparison operation, that should be performed for the calculation of the chromatic aberration amount of the entire image is: 81×200×150=2,430,000 times. The number of times of the chromatic aberration amount addition operation, that is, chromatic aberration amount correction value addition operation that should be performed for the calculation of the chromatic aberration amount of the entire image is: 8.1×200×150=243,000 times. As understood from the explanation given above, when arithmetic operation is performed for each of pixels that make up an image, it is necessary to perform huge amount of calculation.

A search area corresponding to a certain pixel and another search area corresponding to another pixel that is adjacent to the above-mentioned certain pixel overlap each other. Specifically, there is a 9×8 pixel-overlap area therebetween. If such an area overlap is utilized, it seems that an additional search area that should be set for the above-mentioned another adjacent pixel, which is assumed to be processed after the above-mentioned certain pixel, is nine pixels only. Under the assumption explained above, the number of times of white overexposure judgment operations that should be executed in order to calculate the chromatic aberration amount of one pixel of interest is nine; whereas the number of times of addition of chromatic aberration correction values that should be performed for the calculation of the chromatic aberration amount of one pixel of interest is 0.9. Accordingly, it follows that the number of times of white overexposure judgment operation that should be performed for the calculation of the chromatic aberration amount of the entire image is: 9×200×150=270,000, whereas the number of times of the chromatic aberration amount addition operation that should be performed for the calculation of the chromatic aberration amount of the entire image is: 0.9×200×150=27,000.

However, if a plurality of chromatic aberration maps that differ depending on in-screen positions is used in order to perform appropriate correction with due technical consideration given also to chromatic aberration of magnification, it is not practically possible or at best difficult to take an advantage of the overlapping of a search area corresponding to one pixel and another search area corresponding to another pixel that is adjacent to the above-mentioned one pixel for the reduction of calculation amount. Chromatic aberration of magnification is a phenomenon that occurs as a lateral or transverse difference in focal positions of a formed image caused by a lens magnifying different color wavelengths differently. That is, if a plurality of chromatic aberration maps that differ from one pixel of interest to another is used in order to perform appropriate correction with due technical consideration given also to chromatic aberration of magnification, it is not practically possible or at best difficult to use the previous/preceding results of computation. This means that it is necessary to perform calculation starting from scratch even for a pixel overlap area.

Thus, there is a need for calculating chromatic aberration amount speedily and accurately, which is computed for each of pixels that make up an image, with substantially reduced calculation amount, thereby making it possible to perform correction also for chromatic aberration of magnification even in a case where it is not practically possible or at best difficult to take an advantage of the overlapping of a search area corresponding to one pixel and another search area corresponding to another pixel that is adjacent to the above-mentioned one pixel, that is, to utilize the previous/preceding results of computation for the reduction of calculation amount.

An advantage of some embodiments of the invention is to calculate chromatic aberration amount, which is computed for each of all pixels that make up an image, with substantially reduced number of times of arithmetic operation speedily and accurately, thereby making it possible to perform correction for chromatic aberration in an effective manner.

In order to address the above-identified problems without any limitation thereto, the invention provides, as an embodiment thereof, a chromatic aberration correction apparatus that identifies a purple area part of an image on the basis of chrominance signals of image data and further identifies white overexposure pixels each of which has a luminance value indicating saturation on the basis of a luminance signal of the image data so as to perform chromatic aberration correction while regarding a purple area part that appears in the periphery of a white overexposure pixel as an area part affected by chromatic aberration, the chromatic aberration correction apparatus including: a white overexposure information temporary retaining section that temporarily stores the result of a white overexposure judgment made for each pixel; and a chromatic aberration amount calculating section that calculates chromatic aberration amount for each of pixels that make up an image with the use of white overexposure pixel distribution information supplied from the white overexposure information temporary retaining section, the white overexposure pixel distribution information indicating the distribution of the identified white overexposure pixels, and further with the use of chromatic aberration amount distribution information, which indicates the distribution of chromatic aberration amount for each of pixels located in a certain area that is determined when the above-mentioned each of pixels that make up an image is selected as a judgment-target pixel one by one, the chromatic aberration amount distribution information having been set for the above-mentioned each of pixels that make up an image in advance. The chromatic aberration amount calculating section of the chromatic aberration correction apparatus includes: a white overexposure distribution information memory that holds the white overexposure pixel distribution information; a chromatic aberration distribution information memory that holds the chromatic aberration amount distribution information; a chromatic aberration amount memory that stores chromatic aberration amount for the above-mentioned each of pixels that make up an image; a judgment unit that judges whether a selected pixel of interest is a white overexposure pixel or not on the basis of the white overexposure pixel distribution information that is held in the white overexposure distribution information memory, a white overexposure pixel judgment being made for the above-mentioned each of pixels that make up an image; a reader that reads, for each selected pixel of interest that is judged as a white overexposure pixel by the judgment unit, the chromatic aberration amount distribution information for a certain area that is determined on the basis of the selected pixel of interest out of the chromatic aberration distribution information memory; and an adder that adds each chromatic aberration amount contained in the chromatic aberration amount distribution information that is read by the reader to a value of the corresponding position in the storage area of the chromatic aberration amount memory.

In the configuration of the chromatic aberration correction apparatus described in the preceding paragraph, a judgment unit judges whether a selected pixel of interest is a white overexposure pixel or not on the basis of the white overexposure pixel distribution information that is held in the white overexposure distribution information memory, a white overexposure pixel judgment being made for the above-mentioned each of pixels that make up an image; a reader reads, for each selected pixel of interest that is judged as a white overexposure pixel by the judgment unit, the chromatic aberration amount distribution information for a certain area that is determined on the basis of the selected pixel of interest out of the chromatic aberration distribution information memory; and an adder adds each chromatic aberration amount contained in the chromatic aberration amount distribution information that is read by the reader to a value of the corresponding position in the storage area of the chromatic aberration amount memory.

With such a configuration, since it suffices to judge for each of pixels that make up an image whether a selected pixel of interest is a white overexposure pixel or not, as an advantage thereof without any limitation thereto, it is possible to substantially reduce calculation amount, which is far smaller than that of related art for calculating chromatic aberration amount according to which, for example, it is judged for each of pixels that make up an image whether a selected target pixel that is located in a certain search area such as a 9×9 pixel area is a white overexposure pixel or not, where such a white overexposure judgment is made for each pixel that is located in the above-mentioned certain search area unlike the advantageous configuration of an embodiment of the present invention.

In the configuration of the chromatic aberration correction apparatus according to an embodiment of the present invention described above, it is preferable that the chromatic aberration amount distribution information that is held at the chromatic aberration distribution information memory should be set so that chromatic aberration of magnification can be corrected in accordance with the in-screen position of a pixel of interest for which chromatic aberration correction should be performed.

In the preferred configuration of the chromatic aberration correction apparatus described in the preceding paragraph, in order that chromatic aberration of magnification can be corrected, the chromatic aberration amount distribution information that is set in accordance with the in-screen position of a pixel of interest for which chromatic aberration correction should be performed is used. The chromatic aberration amount distribution information is set for each of pixels that make up an image.

With such a preferred configuration, it is possible to perform correction also on chromatic aberration of magnification effectively and accurately. In addition, even when chromatic aberration amount distribution information that differs from one pixel to another is used, the calculation of chromatic aberration amount is not affected at all. Thus, as an advantage thereof without any limitation thereto, it is possible to calculate chromatic aberration amount, which is computed for each of all pixels that make up an image, with substantially reduced amount of calculation speedily and accurately, thereby making it possible to perform correction also for chromatic aberration of magnification in an effective manner.

BRIEF DESCRIPTION OF THE DRAWINGS

FIG. 4 is a diagram that shows an example of a formula that is used for calculating chromatic aberration amount S of a certain pixel of interest;

FIG. 5 is a block diagram that schematically illustrates an example of the configuration of a chromatic aberration amount calculation unit 654 of the chromatic aberration correction unit 1065 according to an exemplary embodiment of the present invention;

FIGS. 8A, 8B, and 8C is a set of conceptual diagrams that schematically illustrates an example of processing performed by the chromatic aberration amount calculation unit 654 according to an exemplary embodiment of the present invention for the calculation of chromatic aberration amount;

DESCRIPTION OF THE PREFERRED EMBODIMENTS

With reference to the accompanying drawings, an apparatus, a method, and a program according to an exemplary embodiment of the present invention is explained below. Note that the concept of the present invention, an exemplary embodiment of which is described below, is applicable to various kinds of image pickup apparatuses such as a digital video camera, a digital still camera, and a camera module that is mounted on or built in a variety of handheld electronic devices such as a mobile phone terminal and the like, without any limitation thereto.

In order to simplify explanation, however, a digital video camera that is capable of capturing moving image data is taken as an example of a variety of image pickup apparatuses to which the concept of the present invention can be applied in the following description of an exemplary embodiment thereof. An image pickup apparatus that is explained below can, for example, acquire and then store sound data in addition to moving-picture data. However, an explanation of an audio signal processing system is omitted in the following description of an exemplary embodiment of the invention in order to simplify explanation.

Configuration Example of Image Pickup Apparatus

An example of the configuration of an image pickup apparatus is explained below.

Figure 1:
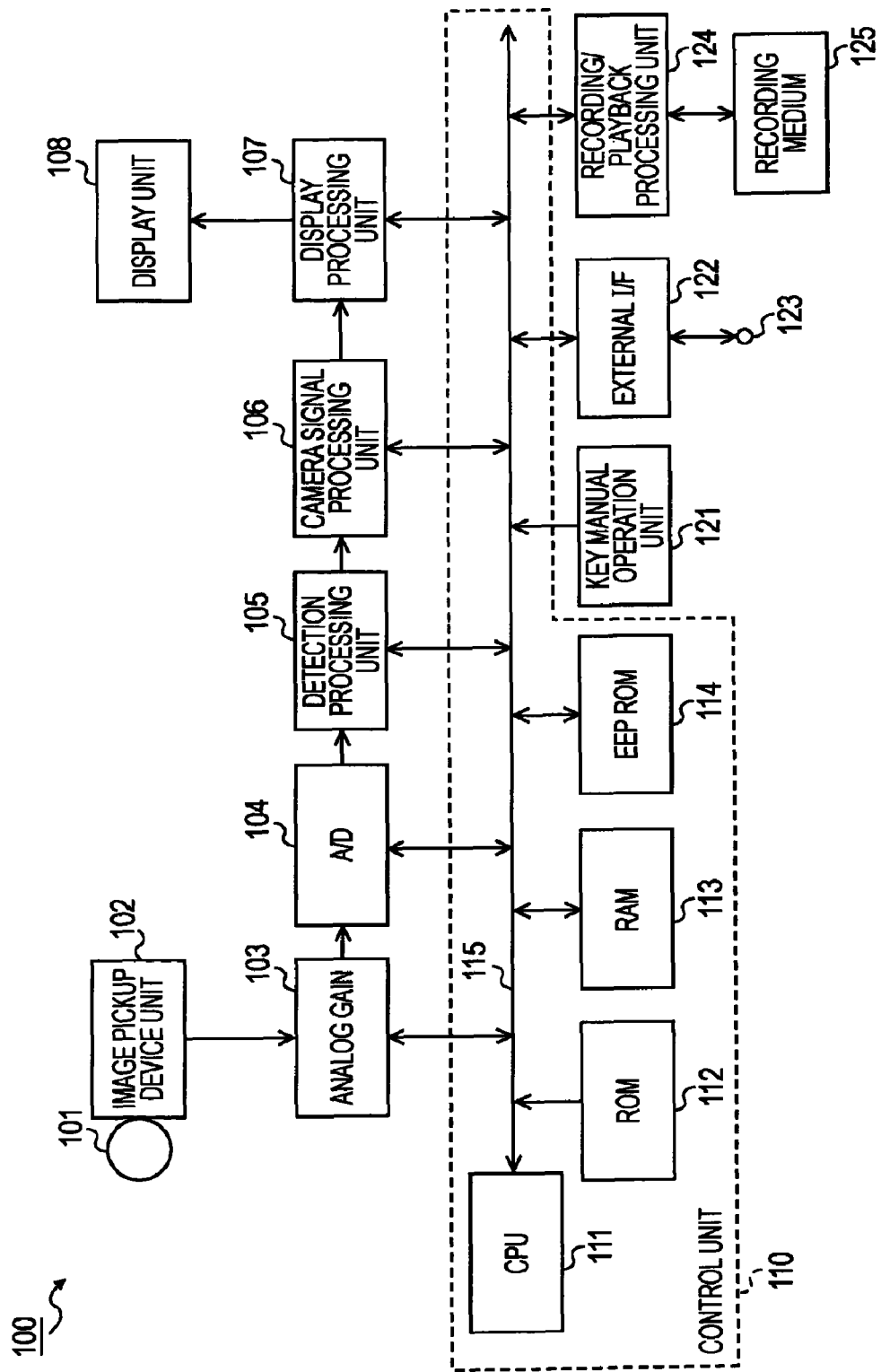
FIG. 1 is a block diagram that schematically illustrates an example of the general configuration of an image pickup apparatus 100 to which an apparatus, a method, and/or a program according to an exemplary embodiment of the present invention is applied.

FIG. 1 is a block diagram that schematically illustrates an example of the general configuration of an image pickup apparatus 100 to which an apparatus, a method, and/or a program according to an exemplary embodiment of the present invention is applied. As illustrated in FIG. 1, the image pickup apparatus 100 according to the present embodiment of the invention is provided with a lens unit 101, an image pickup device unit 102, an analog gain adjustment unit 103, an analog-to-digital converter 104, a detection processing unit 105, a camera signal processing unit 106, a display processing unit 107, and a display unit 108 as functional components that make up an image signal processing system. In addition to the component units of the image signal processing system described above, the image pickup apparatus 100 according to the present embodiment of the invention is further provided with a control unit 110, a key manual operation unit 121, an external interface unit 122, an external input/output terminal 123, a recording/playback processing unit 124, and a recording medium 125. It should be noted that the analog gain adjustment unit 103 is simply shown as ANALOG GAIN in FIG. 1. The analog-to-digital converter 104 is hereafter referred to as A/D converter. The external interface unit 122 is hereafter referred to as external I/F unit.

The control unit 110 controls each of the component blocks of the image pickup apparatus 100 according to the present embodiment of the invention. The control unit 110 is configured as a microprocessor that includes a central processing unit (CPU) 111, a read only memory (ROM) 112, a random access memory (RAM) 113, and an electrically erasable and programmable ROM (EEPROM) 114. In the configuration of the control unit 110, the CPU 111, the ROM 112, the RAM 113, and the EEPROM 114 are interconnected via a CPU bus 115.

The CPU 111 functions as a main controller. For example, the CPU 111 reads out a program that is stored in the ROM 112, the function of which is briefly described below, and then executes the read-out program so as to generate a control signal. The generated control signal is supplied to each component unit. In addition, the CPU 111 receives a signal from each component unit and then performs processing on the basis of the received signal. As mentioned above, the ROM 112 is a memory device that memorizes the program that is executed by the CPU 111 as well as various kinds of data and the like that are used for processing as pre-stored data.

The RAM 113 is a memory device that temporarily stores in-process data, which is a non-final processing result, during the course of various kinds of processing. Accordingly, the RAM 113 is used as a so-called work area. The EEPROM 114 is a so-called non-volatile memory. As a nonvolatile storage, the EEPROM 114 can store various kinds of information that should be retained even when the power of the image pickup apparatus 100 according to the present embodiment of the invention is shut off. A few examples of such stored information that should be retained even when not powered include various setting parameters and a new program that is provided for functional addition, though not limited thereto.

The key manual operation unit 121 is made up of, for example, a video recording standby key, a video recording start key, a video recording stop/pause key, a telephoto/zoom adjustment key, and other various kinds of adjustment keys and function keys. Upon the reception of input instructions or the like from a user, the key manual operation unit 121 converts the user input into an electric signal. Accordingly, the user input is supplied to the control unit 110 in the form of an electric signal. In response to the inputted user instructions, which have been received through the key manual operation unit 121, the control unit 110 controls each component unit of the image pickup apparatus 100. In this way, a user can instruct the execution of various kinds of processing as they desire.

The external I/F unit 122 and the external input/output terminal 123 conform to, for example, the IEEE (Institute of Electrical and Electronics Engineers) 1394 standard, the USB (Universal Serial Bus) standard, or the like. An external device such as a personal computer, a personal video recorder (PVR), or the like that has an interface that conforms to the same standard as that of the external I/F unit 122 and the external input/output terminal 123 can be connected to the external I/F unit 122 and the external input/output terminal 123.

The recording/playback processing unit 124 is a processor unit that is capable of, for example, recording image data that has been supplied to the recording/playback processing unit 124 into the recording medium 125 under the control of the control unit 110 and, in addition thereto, reading image data that was recorded in the recording medium 125 out of the recording medium 125 so as to supply the read-out image data to the display processing unit 107 via the control unit 110 for the purpose of playback (e.g., replay, though not limited thereto) under the control of the control unit 110.

The recording medium 125 is the main storage of the image pickup apparatus 100 according to the present embodiment of the invention. The recording medium 125 can be embodied as a built-in semiconductor memory, a removable memory card that employs a semiconductor memory as its storage chip, a built-in compact hard disk, a variety of removable disc recording media such as an optical disc or the like, or a detachable magnetic tape, without any limitation thereto. In the configuration of the image pickup apparatus 100 according to the present embodiment of the invention, for example, a built-in compact hard disk is used as the recording medium 125.

Note that image data that is to be stored in the recording medium 125 goes through compression processing that is performed by means of a predetermined data compression method prior to the execution of the storage thereof. Image data that has been read out of the recording medium 125 is subjected to decompression processing that is performed by means of a predetermined data decompression method. A data compression/decompression processing unit, which is not illustrated in the drawing, performs such data compression/decompression. As a modified configuration example thereof, the recording/playback processing unit 124 may have such an image data compression/decompression function.

The image pickup apparatus 100 according to the present embodiment of the invention has a recording function and a playback function. The recording function of the image pickup apparatus 100 enables a user to take a video of an object of shooting while monitoring the picture thereof that is displayed on the display screen of the display unit 108 as processed through the aforementioned image signal processing system, and then to record an image signal, that is, a moving-picture signal, which has been obtained as a result of the video shooting, into the recording medium 125. On the other hand, the playback function of the image pickup apparatus 100 enables a user to read a recorded image signal out of the recording medium 125 and then display the read-out picture on the display screen of the display unit 108. Or, as another exemplary mode of the playback function thereof, a recorded image signal that has been read out of the recording medium 125 is supplied to an external device via the external I/F unit 122 and the external input/output terminal 123 so as to be displayed thereon.

Recording Function and Playback Function

In the following description, an example of the recording function, that is, shooting function of the image pickup apparatus as well as the playback function thereof is explained.

First of all, the recording function of the image pickup apparatus 100 according to the present embodiment of the invention is explained below. As illustrated in FIG. 1, the lens unit 101, the image pickup device unit 102, the analog gain adjustment unit 103, the A/D converter 104, the detection processing unit 105, the camera signal processing unit 106, the display processing unit 107, and the display unit 108 that make up the image signal processing system of the image pickup apparatus 100 are interconnected via the common CPU bus 115.

With such a bus-connected configuration, the exchange of data such as data transmission, data reception, and data transfer between these component units that make up the image signal processing system of the image pickup apparatus 100 are basically carried out in an indirect manner via the common CPU bus 115. However, such data interaction is not always performed via the CPU bus 115. In some cases, data interaction is performed directly between one signal-processing component unit and another signal-processing component unit, that is, not through the CPU bus 115. When direct connection is established between one signal-processing component unit and another signal-processing component unit for data transfer while bypassing the CPU bus 115, these two units that make up a part of the image signal processing system of the image pickup apparatus 100 can be regarded as a single combined signal-processing component unit.

Upon the reception of user instructions for video shooting through the key manual operation unit 121, the control unit 110 controls each signal processing unit of the image signal processing system so as to start moving picture shooting. Video shooting and related processing is performed as follows. The image of an object that is shot through the lens unit 101 and formed on the imaging surface (i.e., image plane) of the solid-state imaging device of the image pickup device unit 102 is converted into an electric signal in a sequential manner by the solid-state imaging device. The electric signal, which is generated in an analog moving picture signal format, is supplied to the analog gain adjustment unit 103. A few examples of the solid-state imaging device of the image pickup device unit 102 include a charge coupled device (CCD) sensor or a complementary metal oxide semiconductor (CMOS) sensor.

The analog moving-picture signal that has been supplied from the image pickup device unit 102 to the analog gain adjustment unit 103 is processed thereat for gain adjustment. The gain adjustment is performed in such a manner that the gain of the inputted analog moving-picture signal is adjusted into a predetermined level. After the gain adjustment, the analog moving-picture signal is supplied to the A/D converter 104. The analog moving-picture signal that has been supplied to the A/D converter 104 is converted threat into a digital moving-picture signal, which is digital RAW moving-picture data. After the A/D conversion, the digital moving-picture signal is supplied to the detection processing unit 105. Herein, the digital RAW moving-picture data means digital moving-picture data that has not yet been subjected to development processing. That is, the digital RAW moving-picture signal is an undeveloped digital moving-picture signal that is obtained by performing A/D conversion, after gain adjustment, on the analog moving-picture signal outputted from the image pickup device unit 102.

On the basis of the digital RAW moving-picture data supplied thereto, the detection processing unit 105 generates a plurality of development parameters that is used at the next signal processing block for performing various kinds of image processing. For example, the development parameters include, but not necessarily limited to, a parameter that is used for exposure adjustment processing and a parameter that is used for white balance adjustment processing. These various image-processing parameters are hereafter referred to as a set (i.e., group) of development parameters. The detection processing unit 105 supplies the generated set of development parameters to the camera signal processing unit 106 via the control unit 110. In addition thereto, the detection processing unit 105 further supplies the RAW moving-picture data to the camera signal processing unit 106.

The camera signal processing unit 106 performs various kinds of signal processing so as to generate a luminance signal (Y) and chrominance signals (Cb, Cr). For example, the camera signal processing unit 106 performs black level adjustment processing, white balance adjustment processing, de-mosaic processing, aperture correction processing, gamma (γ) correction processing, Y/C conversion processing, chromatic aberration correction processing, and resolution conversion processing, though not necessarily limited thereto. The de-mosaic processing is color interpolation processing that generates RGB data, that is, three primary color data, for each pixel. In the Y/C conversion processing, a primary-color moving-picture signal is converted into a luminance signal Y and chrominance signals Cb and Cr. A more detailed explanation of processing that is performed by the camera signal processing unit 106 will be given later.

The luminance signal Y and the chrominance signals Cb and Cr that have been generated at the camera signal processing unit 106 are supplied to the display processing unit 107. Then, these signals are converted into a moving-picture signal whose signal format complies with the display signal format of the display unit 108. After the signal format conversion, the moving-picture signal is supplied to the display unit 108. By this means, the moving picture of an object of shooting is displayed on the display screen of the display unit 108.

At the same time, the luminance signal Y and the chrominance signals Cb and Cr that have been generated at the camera signal processing unit 106 are processed for compression at, for example, the aforementioned data compression/decompression processing unit, which is not illustrated in the drawing. Thereafter, the compressed signal is supplied to the recording/playback processing unit 124. Upon the reception of the compressed image data, the recording/playback processing unit 124 stores the received picture data into the recording medium 125 that is built therein in a readable manner.

The display unit 108 is provided with a display device such as a liquid crystal display (LCD), an organic electroluminescence (EL) panel, a cathode ray tube (CRT), or the like. As has already been explained above, the display unit 108 is capable of displaying moving picture on the display device of its own upon the reception of a moving-picture signal from the display processing unit 107.

As explained above, the image pickup apparatus 100 according to the present embodiment of the invention has a recording function, which enables a user to take a video of an object of shooting while monitoring the moving picture thereof that is displayed on the display screen of a display device that is mounted on the display unit 108, and then to record moving-picture data, which has been obtained as a result of the video shooting, into the recording medium 125. When the moving-picture data that has been obtained as a result of the video shooting is recorded into the recording medium 125, the moving-picture data is processed for compression at, for example, the aforementioned data compression/decompression processing unit, which is not illustrated in the drawing. Thereafter, the recording/playback processing unit 124 stores the compressed picture data into the recording medium 125.

Next, the playback function of the image pickup apparatus 100 according to the present embodiment of the invention is explained below. Upon the reception of user instructions for the playback of moving-picture data that is recorded in the recording medium 125, which are inputted through the key manual operation unit 121, the control unit 110 controls the recording/playback processing unit 124 so as to read the moving-picture data (i.e., the luminance signal Y and the chrominance signals Cb, Cr) that is instructed to be played back out of the recording medium 125. The luminance signal Y and the chrominance signals Cb, Cr that have been read out thereof are supplied to, for example, the compression/decompression processing unit, which is not illustrated in the drawing. The moving-picture data that has been read out thereof is then subjected to decompression processing at the compression/decompression processing unit. As a result thereof, an original moving-picture data prior to data compression is obtained. The decompressed original moving-picture data is then supplied to the display processing unit 107 via the control unit 110.

The display processing unit 107 converts the decompressed original moving-picture data into a moving-picture signal whose signal format complies with the display signal format of the display unit 108. After the signal format conversion, the moving-picture signal is supplied to the display unit 108. By this means, the moving picture of the moving-picture data that was read out of the recording medium 125 is displayed on the display screen of a display device that is mounted on the display unit 108.

At the same time, either compressed moving-picture data that has not been subjected to decompression processing or original moving-picture data prior to data compression that has been obtained through decompression processing is supplied to an external device, which is connected to the external input/output terminal 123 of the image pickup apparatus 100, via the external I/F unit 122 and the external input/output terminal 123. By this means, the read-out data is available for use also on the external device.

As explained above, the image pickup apparatus 100 according to the present embodiment of the invention is capable of recording moving-picture data that has been obtained as a result of video shooting into the recording medium 125, and in addition thereto, is capable of playing back moving-picture data that was recorded in the recording medium 125. It should be particularly noted that the image pickup apparatus 100 according to the present embodiment of the invention is capable of calculating chromatic aberration amount, which is computed for each of all pixels that make up an image, with substantially reduced calculation amount efficiently and accurately, thereby making it possible to perform correction for chromatic aberration in a speedy and effective manner.

Camera Signal Processing Unit 106

Figure 2:
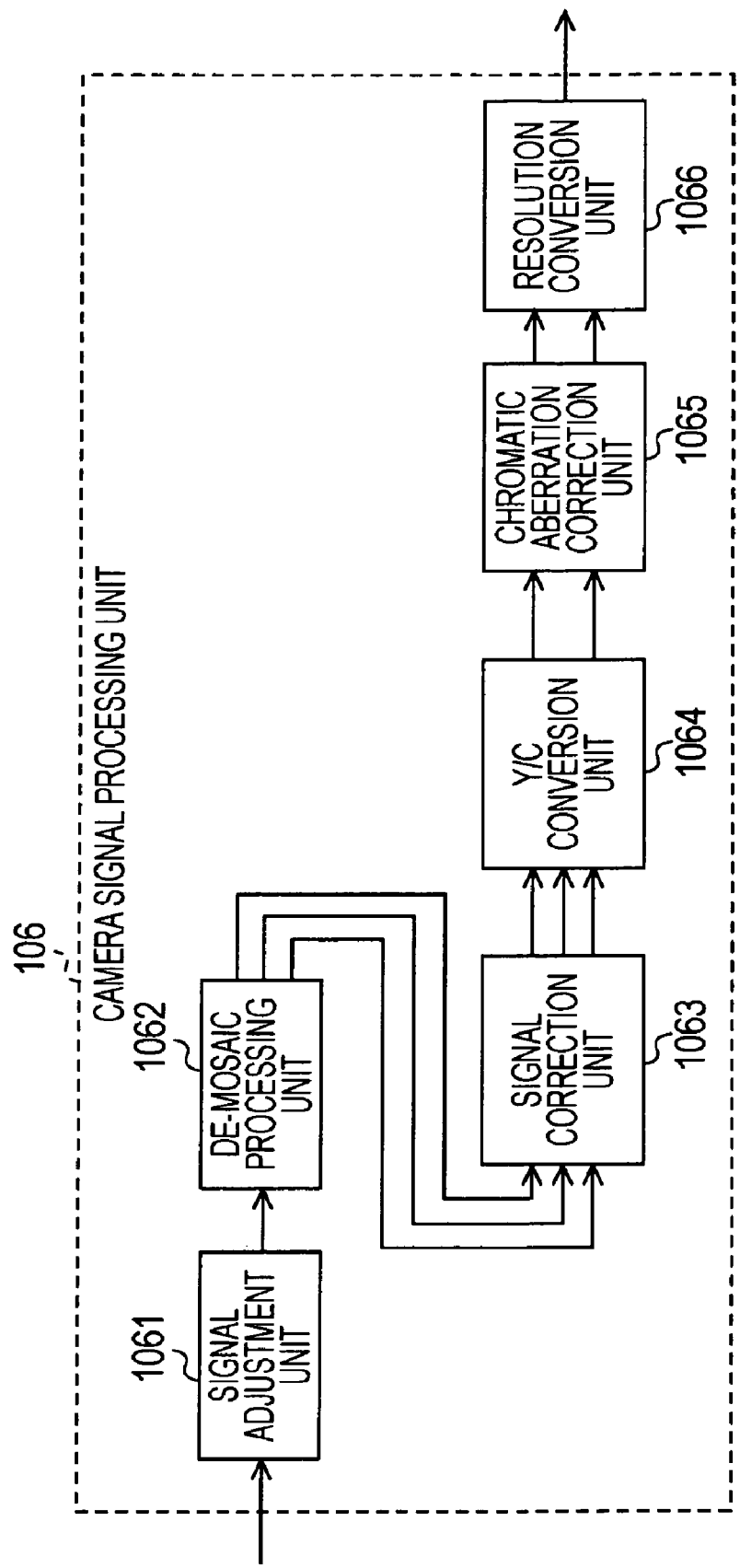
FIG. 2 is a block diagram that schematically illustrates an example of the configuration of a camera signal processing unit 106 that is provided as a component of the image pickup apparatus 100 shown in FIG. 1.

In the following description, an example of the configuration of the camera signal processing unit 106 of the image pickup apparatus 100 according to the present embodiment of the invention, which is illustrated in FIG. 1, as well as an example of the operation thereof is explained in detail. FIG. 2 is a block diagram that schematically illustrates an example of the configuration of the camera signal processing unit 106 that is provided as a component of the image pickup apparatus 100 according to the present embodiment of the invention.

As shown in FIG. 2, the camera signal processing unit 106 according to the present embodiment of the invention is provided with a signal adjustment unit 1061, a de-mosaic processing unit 1062, a signal correction unit 1063, a Y/C conversion unit 1064, a chromatic aberration correction unit 1065, and a resolution conversion unit 1066.

Digital RAW moving-picture data that is supplied from the detection processing unit 105 is inputted into the signal adjustment unit 1061 of the camera signal processing unit 106. The signal adjustment unit 1061 performs various kinds of adjustment processing such as black level adjustment processing, white balance adjustment processing, and the like on the inputted RAW moving-picture data.

Herein, the black level of an image pickup apparatus means an image output that is obtained from an image pickup device of the image pickup apparatus when the image pickup surface of the image pickup device is completely shielded from light. In some cases, an image may not be formed properly due to inaccurate black level reproduction, which might occur because of, for example, the mixing of offset components that are not supposed to be mixed therein due to the effects of other circuit components that are provided at relatively downstream positions when viewed from the relatively upstream image pickup device in a signal processing flow. In order to prevent such improper image formation from occurring, the signal adjustment unit 1061 of the camera signal processing unit 106 performs the black level adjustment of RAW moving-picture data that has been supplied thereto from the detection processing unit 105 on the basis of the aforementioned parameters that have also been supplied thereto from the detection processing unit 105 via the control unit 110.

When an object is shot with the use of an image pickup apparatus, the hues thereof differ from one to another even for the same object of shooting, which depends on the types of light used at the time of shooting (e.g., solar light, fluorescent light, and the like). In contrast, human eye has such visual characteristics that the color of a white object is normally recognized as white. In view of the foregoing, the signal adjustment unit 1061 adjusts the overall color balance of an image, or, more specifically, the balance of red (R) and blue (B), on the basis of parameters supplied from the detection processing unit 105 so that the color of a white object is appropriately represented as white.

Note that the signal adjustment unit 1061 may perform noise reduction processing and/or other various kinds of correction processing in addition to the black level adjustment processing and the white balance adjustment processing explained above. After that the signal adjustment unit 1061 has performed various kinds of signal adjustment processing on RAW moving-picture data, it supplies the processed RAW moving-picture data to the de-mosaic processing unit 1062.

The de-mosaic processing unit 1062 generates data that includes all color signals that are necessary for each of pixels that make up an image from RAW moving-picture data that has been generated with the use of, for each pixel, a color signal that differs from one pixel to another corresponding to a color filter that is used in the image pickup device. In the configuration of the image pickup apparatus 100 according to the present embodiment of the invention, the de-mosaic processing unit 1062 performs processing for generating a three-primary color signal including a red (R) color component, a green (G) color component, and a blue (B) color component. The R, G, and B three-primary-color signal that has been generated at the de-mosaic processing unit 1062, that is, three-primary-color data, is supplied to the signal correction unit 1063.

The signal correction unit 1063 performs signal correction processing such as aperture correction, gamma correction, and the like on the three-primary-color image data supplied thereto. Herein, the aperture correction means a kind of correction processing that is performed so as to increase sharpness by performing edge enhancement on the three-primary-color image data supplied thereto. In the exemplary configuration of the image pickup apparatus 100 according to the present embodiment of the invention, the level of edge enhancement is adjustable through, for example, a control signal that is supplied from the control unit 110 in accordance with user instructions, which are inputted through the key manual operation unit 121. With such edge enhancement level adjustment, it is possible to obtain a desired image such as a sharp image or a soft image.

On the other hand, the gamma correction is a kind of correction processing that is performed so as to adjust the relationships between the three-primary-color moving-picture data supplied thereto and an actual signal that is to be outputted, thereby making it possible to obtain an image having more natural color. That is, the gamma ($\gamma$) value indicates the ratio of a change in a voltage-reduced value to a change in the brightness of an image. It is ideal that the gamma value should be as close to "1" as possible. However, the gamma value may practically deviate from the ideal value of one due to the characteristics of devices used or the like. In view of the foregoing, the signal correction unit 1063 corrects the gamma-value error of the three-primary-color moving-picture data supplied thereto so that the corrected gamma value thereof should be approximately one. After these kinds of correction processing performed at the signal correction unit 1063, though not necessarily limited thereto, the corrected three-primary-color moving-picture data is supplied to the Y/C conversion unit 1064.

The Y/C conversion unit 1064 converts the corrected three-primary-color moving-picture data supplied thereto into a luminance signal Y and chrominance signals Cb and Cr in accordance with a predetermined set of formulae. After the conversion, the Y/C conversion unit 1064 supplies the generated luminance signal Y and chrominance signals Cb and Cr to the chromatic aberration correction unit 1065. That is, the Y/C conversion unit 1064 generates a luminance signal Y and chrominance signals Cb and Cr from three-primary-color data that is made up of a red (R) color component signal, a green (G) color component signal, and a blue (B) color component signal in accordance with a predetermined set of formulae.

Specifically, in the configuration of the image pickup apparatus 100 according to the present embodiment of the invention, the Y/C conversion unit 1064 generates (i.e., calculates) the luminance signal Y using the following formula (1), the chrominance signal Cr using the following formula (2), and the chrominance signal Cb using the following formula (3).

$$Y = 0.3R + 0.6G + 0.1B \qquad (1)$$

$$Cr = 0.7R - 0.6G - 0.1B \qquad (2)$$

$$Cb = -0.3R - 0.6G + 0.9B \qquad (3)$$

Then, the luminance signal Y and the chrominance signals Cb and Cr that have been generated at the Y/C conversion unit 1064 in accordance with the respective formulae shown above are supplied to the chromatic aberration correction unit 1065.

When an image of an object that is shot through a lens is formed on the imaging surface of an imaging device, the formed image may have some focal shift (differences) in some cases depending on the different wavelengths of light, which is called as a chromatic aberration phenomenon. The chromatic aberration correction unit 1065 performs correction on such chromatic aberration. The chromatic aberration correction unit 1065 makes a judgment on a pixel-by-pixel basis as to whether each judgment target pixel among pixels that make up an image is a "white overexposure" pixel (i.e., whiteout pixel) or not on the basis of the luminance signal Y. In addition, the chromatic aberration correction unit 1065 calculates the "degree of purpleness", which is a value that indicates how much the color of the calculation target pixel is close to purple on the basis of the chrominance signals Cb and Cr, where such a purple closeness level calculation is also performed for each of pixels that make up the image. Then, the chromatic aberration correction unit 1065 generates a chromatic aberration correction signal on the basis of the results of such a white overexposure judgment and a purple closeness level calculation so as to perform chromatic aberration correction on the chrominance signals Cb and Cr. A more detailed explanation of processing that is performed by the chromatic aberration correction unit 1065 will be given later. Then, the chrominance signals Cb and Cr that have been subjected to chromatic aberration correction as well as the luminance signal Y are outputted from the chromatic aberration correction unit 1065. The outputted chrominance signals Cb and Cr and luminance signal Y are inputted into the resolution conversion unit 1066.

The resolution conversion unit 1066 performs image-scaling processing on the luminance signal Y and the chrominance signals Cb and Cr that have been supplied thereto. Specifically, the resolution conversion unit 1066 performs pixel-skipping processing or pixel-interpolation processing on the luminance signal Y and the chrominance signals Cb and Cr that have been supplied thereto. By this means, the resolution conversion unit 1066 generates a resolution-converted luminance signal Y and chrominance signals Cb and Cr, which have a desired resolution. Then, the resolution-converted luminance signal Y and chrominance signals Cb and Cr are outputted from the resolution conversion unit 1066. Thereafter, an image corresponding to the resolution-converted luminance signal Y and chrominance signals Cb and Cr that have been outputted from the resolution conversion unit 1066 is displayed on the display unit 108 shown in FIG. 1 after having been processed at the display processing unit 107 shown therein. In addition, after having been subjected to data compression, the image is stored in the recording medium 125 through the recording/playback processing unit 124.

As explained above, the camera signal processing unit 106 is configured to perform various kinds of signal processing explained above on the RAW moving-picture data of an object of shooting that is acquired/captured through the image pickup device unit 102. As a final processing result thereof, the camera signal processing unit 106 is configured to be capable of generating Y/C data having a desired resolution as display data and/or recording data and of outputting the generated data for the purpose of display and/or recording. As explained in detail below, it should be particularly noted that the chromatic aberration correction unit 1065 of the camera signal processing unit 106 according to the present embodiment of the invention is configured to be capable of calculating chromatic aberration amount, which is computed for each of pixels that make up an image, with substantially reduced calculation amount that is far smaller than that of related art, thereby making it possible to perform correction for chromatic aberration in a speedy and effective manner.

Chromatic Aberration Correction Unit 1065

Figure 3:
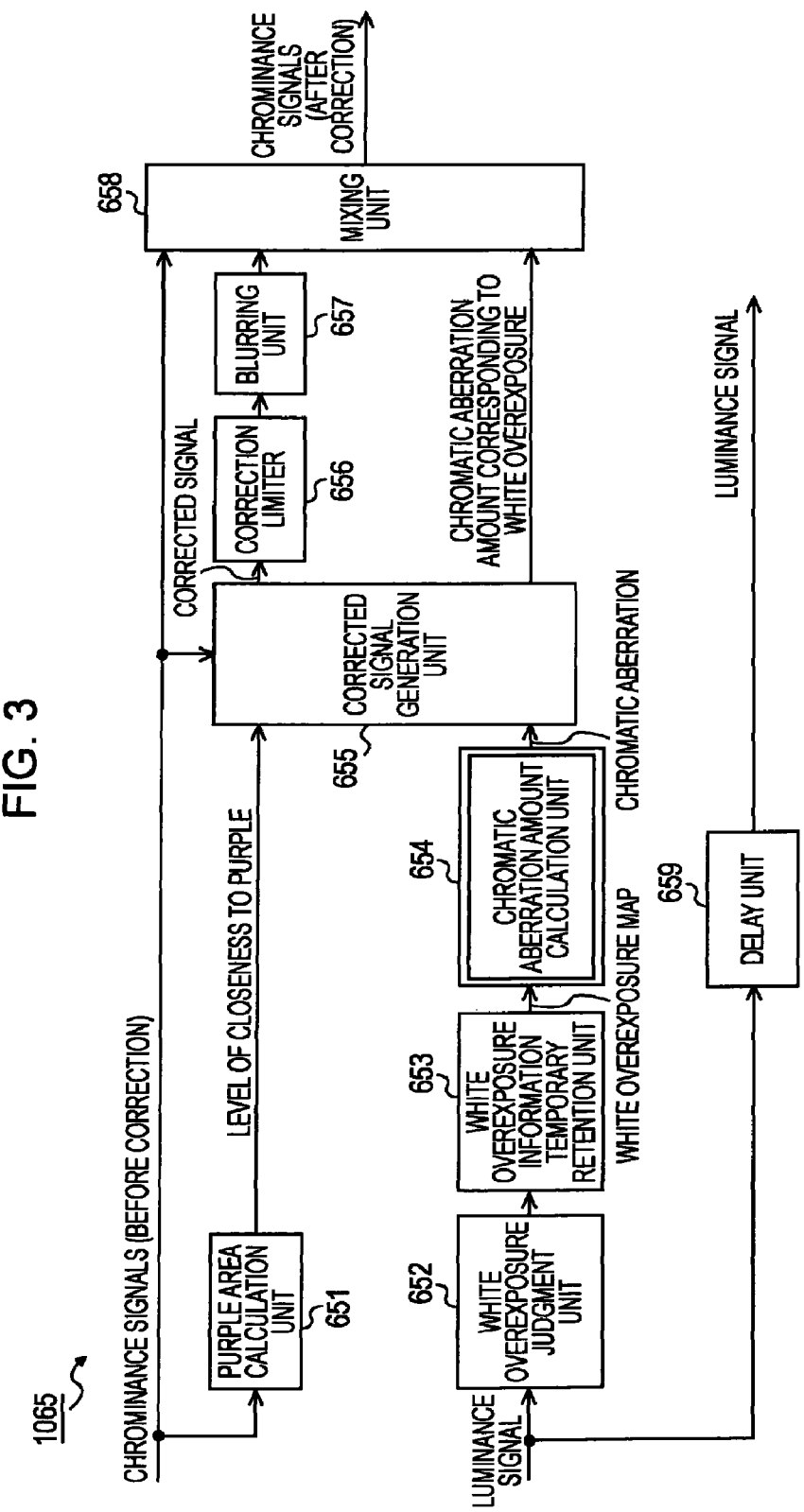
FIG. 3 is a block diagram that schematically illustrates an example of the configuration of a chromatic aberration correction unit 1065 shown in FIG. 2.

Next, an example of the configuration of the chromatic aberration correction unit 1065 that is provided as a component block of the camera signal processing unit 106 of the image pickup apparatus 100 according to the present embodiment of the invention as well as an example of the operation thereof is explained in detail below. FIG. 3 is a block diagram that schematically illustrates an example of the configuration of the chromatic aberration correction unit 1065 according to the present embodiment of the invention.

As briefly explained above, the chromatic aberration correction unit 1065 according to the present embodiment of the invention performs chromatic aberration correction on chrominance signals Cb and Cr on the basis of white-overexposure pixel information that indicates whether a certain pixel of interest among pixels that make up an image is a white overexposure pixel or not, which is judged on the basis of a luminance signal Y for each of pixels that make up the image, and further on the basis of a purple-closeness-level pixel information that indicates how much the color of a calculation target pixel is close to purple, where such a purple closeness level calculation is performed on the basis of the chrominance signals Cb and Cr for each of pixels that make up the image.

The reason why the chromatic aberration correction unit 1065 according to the present embodiment of the invention performs chromatic aberration correction on chrominance signals Cb and Cr as briefly explained above, or more specifically, on the basis of white-overexposure pixel information, is that the negative effects of chromatic aberration are not so noticeable even when it occurs where there is no white overexposure pixel. That is, the effects of chromatic aberration correction will be small when it is performed at a non-white-overexposure pixel. In connection therewith, generally speaking, the possibility of the occurrence of white overexposure at, and in the vicinity of, a purple image portion, that is, purple image area part, is very small because purple has a small green (G) value and thus has a small luminance (Y) value. In other words, the possibility of the presence of an original purple image portion in the neighborhood of a white overexposure image area is very small. Herein, the term "original purple" means purple that is not attributable to chromatic aberration at all. Accordingly, the chromatic aberration correction unit 1065 according to the present embodiment of the invention performs chromatic aberration correction on any purple pixel that appears in the periphery (i.e., vicinity or neighborhood) of each white overexposure pixel. That is, any purple pixel that appears in the periphery of each white overexposure pixel is regarded as a non-original purple pixel whose purple color is caused by chromatic aberration.

Since the chromatic aberration correction unit 1065 according to the present embodiment of the invention performs chromatic aberration correction while taking the presence/absence of a white overexposure pixel into consideration, it is possible to avoid unnecessary correction that does not contribute to the improvement of image quality so much. Therefore, it is possible to perform chromatic aberration correction in a more efficient manner than otherwise.

Colors such as purple and green may appear due to the effects of chromatic aberration. Generally speaking, when a certain color has a large luminance (Y) value, its green (G) value is also large. Therefore, there is a large possibility that an original green image portion is present in the neighborhood of a white overexposure image area, where the term "original green" means green that is not attributable to chromatic aberration at all. Therefore, if correction were applied to green improperly, that is, without due technical consideration, unintended correction effects might be produced. For example, there is an adverse possibility that the color of leaves of a tree is "deleted" for a video image of sunlight trembling through the leaves thereof. For this reason, the chromatic aberration correction unit 1065 is configured so as not to perform any chromatic aberration correction on green.

In the following description, an example of the configuration and operation of the chromatic aberration correction unit 1065 according to the present embodiment of the invention are explained in detail. As shown in FIG. 3, the chromatic aberration correction unit 1065 according to the present embodiment of the invention is provided with a purple area calculation unit 651, a white overexposure judgment unit 652, a white overexposure information temporary retention unit 653, a chromatic aberration amount calculation unit 654, a corrected signal generation unit 655, a correction limiter 656, a blurring unit 657, a mixing unit 658, and a delay unit 659.

As illustrated in FIG. 3, chrominance signals Cb and Cr that have been outputted from the Y/C conversion unit 1064 are inputted into each of the purple area calculation unit 651, the corrected signal generation unit 655, and the mixing unit 658 of the chromatic aberration correction unit 1065. On the other hand, a luminance signal Y that has been outputted from the Y/C conversion unit 1064 is inputted into the white overexposure judgment unit 652 and the delay unit 659. At the delay unit 659, the inputted luminance signal Y is delayed by a delay amount that is equal to the length of time taken for chromatic aberration correction processing that is performed on the chrominance signals Cb and Cr. The delayed luminance signal Y is supplied to the next circuit block, which is the aforementioned resolution conversion unit 1066.

The purple area calculation unit 651 calculates the level of closeness to purple, that is, the degree of purpleness, which is a value that indicates how much the color of a calculation target pixel is close to purple on the basis of the chrominance signals Cb and Cr. Such a purple closeness level calculation is performed for each of pixels that make up an image. Thereafter, the purple area calculation unit 651 outputs the result of the purple closeness level calculation to the corrected signal generation unit 655. That is, the purple area calculation unit 651 identifies the purple portion, that is, purple area, of an image.

On the other hand, the white overexposure judgment unit 652 makes a judgment as to whether the signal level of the inputted luminance signal Y is not smaller than a predetermined threshold value or not on a pixel-by-pixel basis. In other words, the white overexposure judgment unit 652 makes a judgment as to whether the luminance value of the inputted luminance signal Y indicates saturation or not for each pixel. Then, the white overexposure judgment unit 652 supplies the result of such a white overexposure judgment for each pixel to the white overexposure information temporary retention unit 653. The white overexposure judgment result for each pixel is supplied as, for example, one-bit information. As a non-limiting specific example thereof, in the following description of this specification, it is assumed that the white overexposure judgment unit 652 assigns a value "1" to each pixel which is a white overexposure pixel, whereas the white overexposure judgment unit 652 assigns a value "0" to each pixel which is not a white overexposure pixel. Then, the white overexposure judgment unit 652 outputs the value 1 to the white overexposure information temporary retention unit 653 for each pixel which is judged as a white overexposure pixel as a result of the white overexposure judgment, whereas the white overexposure judgment unit 652 outputs the value 0 to the white overexposure information temporary retention unit 653 for each pixel which is not judged as a white overexposure pixel as a result of the white overexposure judgment. In the description of this specification as well as in the recitation of appended claims, each pixel at which white overexposure has now occurred is referred to as "white overexposure pixel".

The white overexposure information temporary retention unit 653 has a built-in storage chip such as a random access memory (RAM). Having such a memory of its own, the white overexposure information temporary retention unit 653 temporarily stores the result of a white overexposure judgment made for each pixel, which has been supplied from the white overexposure judgment unit 652 as information that indicates, for each pixel, whether a certain pixel of interest is a white overexposure pixel or not. On the basis of the temporarily stored white overexposure judgment information, the white overexposure information temporary retention unit 653 creates a white overexposure map that is to be used at the next component block, that is, the chromatic aberration amount calculation unit 654. The white overexposure map indicates the distribution of peripheral white overexposure pixels around a certain pixel of interest. In the description of this specification as well as in the recitation of appended claims, the white overexposure map may be referred to as "white overexposure pixel distribution information" or "white overexposure distribution information". The white overexposure information temporary retention unit 653 supplies the created white overexposure map to the chromatic aberration amount calculation unit 654.

The chromatic aberration amount calculation unit 654 has a built-in storage chip such as a random access memory (RAM), a read only memory (ROM), or the like. Being provided with such a built-in memory, the chromatic aberration amount calculation unit 654 has a chromatic aberration model as pre-stored information in the storage area thereof. The chromatic aberration model is information on the amount of correction for chromatic aberration (i.e., chromatic aberration amount) that is preset for pixels located in the neighborhood of a certain pixel of interest. The chromatic aberration amount calculation unit 654 creates a chromatic aberration map, which indicates the distribution of chromatic aberration amount, out of the chromatic aberration model. Hereafter, the chromatic aberration map (model) may be referred to as "chromatic aberration amount distribution information" or "chromatic aberration distribution information". With the use of the chromatic aberration map that is derived from the chromatic aberration model stored in the chromatic aberration amount calculation unit 654 itself and the white overexposure map that has been supplied from the white overexposure information temporary retention unit 653 and stored therein, the chromatic aberration amount calculation unit 654 calculates the integral value of the chromatic aberration amount of a certain pixel of interest as affected from its peripheral white overexposure pixels. Then, the chromatic aberration amount calculation unit 654 supplies the calculated integral chromatic aberration amount to the corrected signal generation unit 655.

On the basis of the chromatic aberration amount that has been supplied from the chromatic aberration amount calculation unit 654, and further on the basis of the level of closeness to purple that has been supplied from the purple area calculation unit 651, the corrected signal generation unit 655 calculates the amount of chromatic aberration corresponding to white overexposure, that is, the amount of chromatic aberration correction that should be performed on purple pixels that are located in the neighborhood of the white overexposure pixel. Then, the corrected signal generation unit 655 performs chromatic aberration correction on pre-correction chrominance signals Cb and Cr, or, if collectively referred to, a pre-correction chrominance signal, so as to generate post-chromatic-aberration-correction chrominance signals Cb and Cr, or, if collectively referred to, a post-chromatic-aberration-correction chrominance signal. Thereafter, the corrected signal generation unit 655 supplies the generated correction signal (i.e., corrected signal) to the correction limiter 656. On the other hand, the corrected signal generation unit 655 supplies the calculated amount of chromatic aberration corresponding to white overexposure to the mixing unit 658.

The correction limiter 656 performs further correction on the corrected signal that has been inputted from the corrected signal generation unit 655 so as to compensate the reduced amount of chroma saturation thereof. Specifically, the correction limiter 656 detects any portion of an image whose chroma saturation has been excessively reduced through the chromatic aberration correction processing performed by the corrected signal generation unit 655. Then, after the detection of such an image portion, the correction limiter 656 performs chroma saturation correction on the chromatic-aberration-corrected signal while using the chroma saturation of peripheral pixels as a reference. Thereafter, the correction limiter 656 supplies the chroma-saturation-corrected signal to the blurring unit 657.

The blurring unit 657 uses a low pass filter (LPF) so as to perform image-blurring processing on the chroma-saturation-corrected signal that has been inputted from the correction limiter 656. Through the image-blurring processing, any correction unevenness is rectified. Thereafter, the blurring unit 657 supplies the blur-processed corrected signal to the mixing unit 658.

Since the chromatic-aberration-corrected signal is further processed at the correction limiter 656 and the blurring unit 657 as explained above, it is possible to reduce artificial and unnatural image correction effects that are conspicuous. Thus, it is possible to obtain more natural chromatic aberration correction results than in a case where such post-chromatic-aberration correction is not performed.

The mixing unit 658 mixes the pre-correction chrominance signal that has been inputted therein and the corrected signal that has been supplied from the blurring unit 657 on the basis of the above-mentioned amount of chromatic aberration corresponding to white overexposure, which has been supplied from the corrected signal generation unit 655. As a result of such mixing, the mixing unit 658 generates and then outputs post-correction chrominance signals Cb and Cr, or, if collectively referred to, a post-correction chrominance signal. That is, the mixing unit 658 determines the mixing ratio for the corrected signal and the uncorrected signal on the basis of the chromatic aberration amount. In this way, the mixing unit 658 mixes the corrected signal and the uncorrected signal in such a manner that the corrected signal is intensified for each pixel at which chromatic aberration correction has been performed whereas the uncorrected signal is intensified for each pixel at which chromatic aberration correction has not been performed. With the mixing of the corrected signal and the uncorrected signal as explained above, the mixing unit 658 ensures that the uncorrected signal is "partially mirrored" on the corrected signal in accordance with the mixing ratio that is determined on the basis of the chromatic aberration amount. By this means, it is possible to obtain a more natural post-correction signal than otherwise.

Processing Performed by Chromatic Aberration Amount Calculation Unit 654

In the processing performed by the chromatic aberration amount calculation unit 654 of the chromatic aberration correction unit 1065 according to the present embodiment of the invention, the aggregate number of times of arithmetic operation that is made up of the number of times of white overexposure judgment operation, that is, white overexposure comparison operation, and the number of times of chromatic aberration addition operation is significantly decreased. More specifically, the number of times of the former of these two operations is significantly decreased. By this means, it is possible to substantially reduce the amount of calculation that is performed by the chromatic aberration amount calculation unit 654 as described in detail below.

First of all, before the detailed explanation of the processing that is performed by the chromatic aberration amount calculation unit 654 according to the present embodiment of the invention is given, as background information, the amount of chromatic aberration that is to be calculated for each pixel of interest, that is, for a certain pixel of interest on a pixel-by-pixel basis, is explained below in order to facilitate the understanding of the technical concept of the present invention and to clarify the advantageous effects of the present invention, both of which are aimed without any explicit or implicit intention to excessively limit the scope of the present invention. In addition, as further background information, related art for calculating the amount of chromatic aberration is also explained below prior to the explanation of the processing that is performed by the chromatic aberration amount calculation unit 654 according to the present embodiment of the invention for the same purposes.

Amount of Chromatic Aberration that is to be Calculated

In the processing of a chromatic aberration amount calculation unit (654) according to related art, the amount of chromatic aberration for a certain pixel of interest is calculated on a pixel-by-pixel basis as follows. It should be particularly noted that, although the same reference numerals are used in the following description of this specification as well as in the illustration of the accompanying drawings for the corresponding component blocks in the related art configuration without any parenthesis or the like, the same reference numerals are used therein merely for the purpose of facilitating the understanding of the correspondences therebetween; and thus, it is not intended at all to self-impair the novelty and unobviousness of the invention on the basis thereof or to excessively limit the scope of the invention. A white overexposure map is supplied from a white overexposure information temporary retention unit 653 to the chromatic aberration amount calculation unit 654. The chromatic aberration amount calculation unit 654 creates a chromatic aberration map from a chromatic aberration model that is stored in the memory of its own. The chromatic aberration model is information related to the amount of correction for chromatic aberration (i.e., chromatic aberration amount) that is preset for pixels located in the neighborhood of a certain pixel of interest. On the basis of the white overexposure map information and the chromatic aberration map information, the chromatic aberration amount calculation unit 654 takes, if there is any white overexposure pixel in a search area surrounding the pixel of interest, including the position thereof, a value for chromatic aberration correction out of the chromatic aberration map for each white overexposure pixel that is present therein. Then, the taken-out values for chromatic aberration correction are integrated so as to obtain the chromatic aberration amount of the pixel of interest.

Accordingly, the chromatic aberration amount of a certain pixel of interest, which is hereafter denoted as S, can be calculated using the formula (1) shown in FIG. 4. FIG. 4 is a diagram that shows an example of a formula that is used for calculating the chromatic aberration amount S of a certain pixel of interest. As shown therein, the reference symbol S denotes the chromatic aberration amount of a certain pixel of interest, which is a solution to be found herein. The set of reference symbols "x, y" denotes a position (i.e., coordinates) in a search area wherein the search area that surrounds the pixel of interest, including the position of the pixel of interest, is defined as "m×n pixels". Herein, the above-mentioned certain pixel of interest is the center of the m×n pixels defined above. For example, let the search area be defined as a 9×9 pixel area. In addition, it is further assumed herein that the position of a certain pixel is shown as a value ranging from 0 to 8, when viewed in each of vertical and horizontal directions. Under these assumptions, the coordinates of the uppermost and leftmost pixel [x,y] in this search area is represented as [0,0], whereas the coordinates of the above-mentioned certain pixel of interest, which is the center of the 9×9 pixels as defined above, is represented as [4,4].

The reference symbol "Mxy" denotes a chromatic aberration correction value for each of positions [x,y] on the chromatic aberration map, which is provided in the chromatic aberration amount calculation unit 654. On the other hand, the reference symbol "Wxy" denotes white overexposure presence/absence information for each of positions [x,y] on the white overexposure map, which is held by the white overexposure information temporary retention unit 653. In this non-limiting exemplary configuration, the white overexposure presence/absence information Wxy takes a value of "1" if a certain pixel that lies at the coordinates [x,y] on the white overexposure map is a white overexposure pixel, whereas it takes a value of "0" if the above-mentioned certain pixel that lies at the coordinates [x,y] on the white overexposure map is not a white overexposure pixel.

According to the formula (1) that is shown in FIG. 4, the chromatic aberration amount S of a certain pixel of interest is calculated as follows. All pixels at which white overexposure has now occurred, that is, all pixels that are judged as white overexposure pixels, are identified in the search area on the white overexposure map, which is determined on the basis of the above-mentioned certain pixel of interest. The term "identified" in the preceding sentence encompasses the meaning of "located" without any limitation thereto. Thereafter, the chromatic aberration correction values of all pixels on the chromatic aberration map whose positions correspond to those (i.e., positions) of the respective ones of the above-mentioned all pixels that are judged as white overexposure pixels on the white overexposure map are taken out of the chromatic aberration map. Then, these taken-out chromatic aberration correction values of the pixels that lie at the corresponding positions on the chromatic aberration map are summed up, that is, integrated. The result of the summation (i.e., integration) is obtained as the chromatic aberration amount S of the above-mentioned certain pixel of interest.

Configuration and Processing for Calculating Amount of Chromatic Aberration (Related Art)

Figure 10:
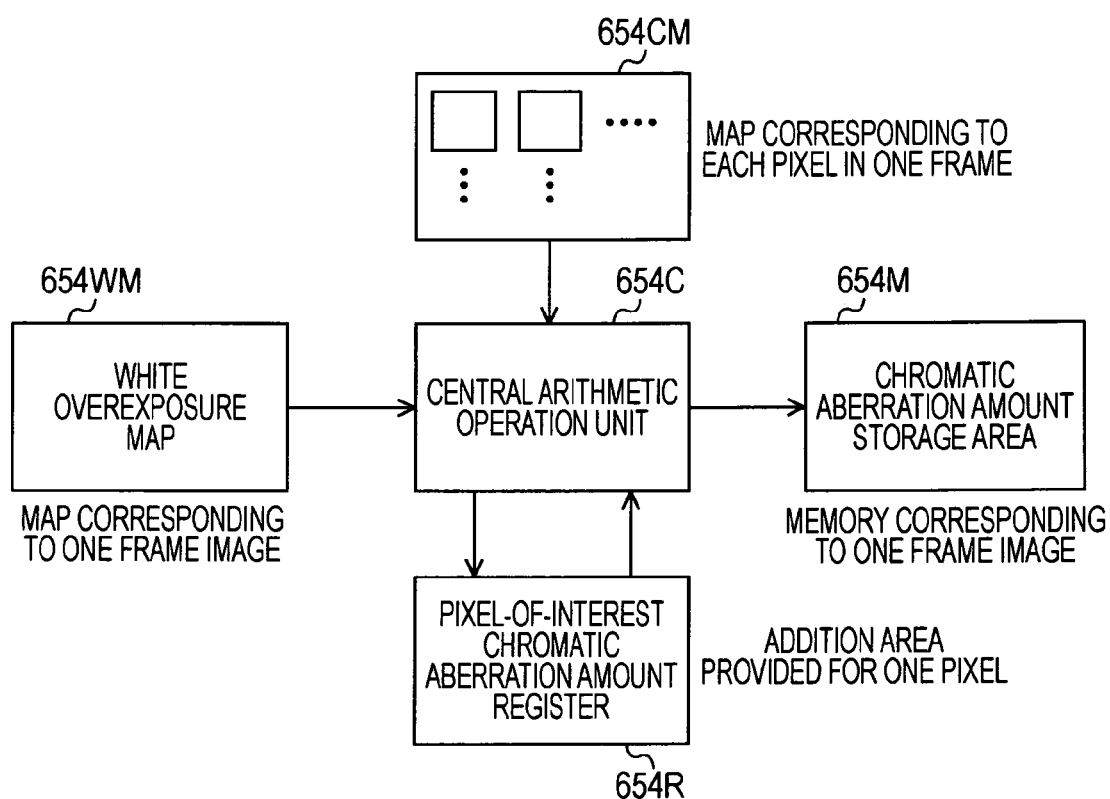
FIG. 10 is a diagram that schematically illustrates an example of the configuration of a chromatic aberration amount calculation unit (654) according to related art.

Next, an example of the configuration of the chromatic aberration amount calculation unit 654 of the chromatic aberration correction unit 1065 according to related art, which is similar to that of FIG. 3, is explained below. FIG. 10 is a diagram that schematically illustrates an example of the configuration of a chromatic aberration amount calculation unit 654 according to related art. As illustrated in FIG. 10, the chromatic aberration amount calculation unit 654 according to related art is provided with a white overexposure map memory 654WM, a chromatic aberration map memory 654CM, a chromatic aberration amount storage unit 654M, which is a chromatic aberration amount memory, a pixel-of-interest chromatic aberration amount register 654R, and a central arithmetic operation unit 654C, which performs not only arithmetic operation but also other central processing as described in detail below.

The white overexposure map memory 654WM, the chromatic aberration map memory 654CM, and the chromatic aberration amount storage unit 654M can be embodied as a plurality of RAMs. Or, these memories 654WM, 654CM, and 654M may be provided in a single RAM. In the latter case, they are provided in a plurality of memory areas different from one another in the same single RAM. The pixel-of-interest chromatic aberration amount register 654R may be provided as a dedicated register, or may be embodied as a part of any memory unit built therein. The central arithmetic operation unit 654C may be provided as, for example, a dedicated CPU. Or, the aforementioned CPU 111 of the control unit 110 of the image pickup apparatus 100 may function also as the central arithmetic operation unit 654C.

The white overexposure map memory 654WM stores a white overexposure map that has been generated by the white overexposure information temporary retention unit 653. The white overexposure map corresponds to, for example, an image for one frame. The chromatic aberration map memory 654CM stores a chromatic aberration map, which is created on the basis of a chromatic aberration model that has been stored in the chromatic aberration amount calculation unit 654 in advance. The chromatic aberration map has a size corresponding to a search area for the acquisition of chromatic aberration for each of pixels that make up an image for one frame. For example, the search area is defined as a pixel array matrix of vertical nine pixels and horizontal nine pixels, that is, 9×9 pixels.

The pixel-of-interest chromatic aberration amount register 654R is an addition area that is used for calculating the chromatic aberration amount of a pixel of interest. The chromatic aberration amount storage unit 654M is a memory that stores the chromatic aberration amount that has been calculated for each of pixels that make up an image for one frame. The central arithmetic operation unit 654C identifies, which encompasses the meaning of "locates" without any limitation thereto, one white overexposure pixel in the search area at the center of which the pixel of interest lies on the white overexposure map that is stored in the white overexposure map memory 654WM. In such white overexposure pixel identification, the central arithmetic operation unit 654C uses the white overexposure map as a referential basis of identification. After the identification of the above-mentioned one white overexposure pixel, the central arithmetic operation unit 654C acquires the chromatic aberration amount, that is, chromatic aberration correction value, corresponding to the above-mentioned one white overexposure pixel from the corresponding pixel position on the chromatic aberration map for this pixel of interest, which is stored in the chromatic aberration map memory 654CM. The acquired chromatic aberration amount is then added to the value accumulated at the pixel-of-interest chromatic aberration amount register 654R. The series of operations described above is performed on a pixel-of-interest-by-pixel-of-interest basis.

The above-explained series of operations that includes white overexposure pixel identification, chromatic aberration amount acquisition, and chromatic aberration amount addition is performed for each of all pixels that lie in the search area at the center of which this pixel of interest lies. As a result thereof, the chromatic aberration amount of this pixel of interest is calculated at the pixel-of-interest chromatic aberration amount register 654R. Thereafter, the chromatic aberration amount of this pixel of interest that has been calculated at the pixel-of-interest chromatic aberration amount register 654R is stored into the corresponding pixel area of the chromatic aberration amount storage unit 654M through the central arithmetic operation unit 654C. Since the series of operations described above is performed on a pixel-of-interest-by-pixel-of-interest basis as explained above, as a final processing result, chromatic aberration amount for each of all pixels that make up an image for one frame is stored into the corresponding pixel area of the chromatic aberration amount storage unit 654M.

Figure 11:
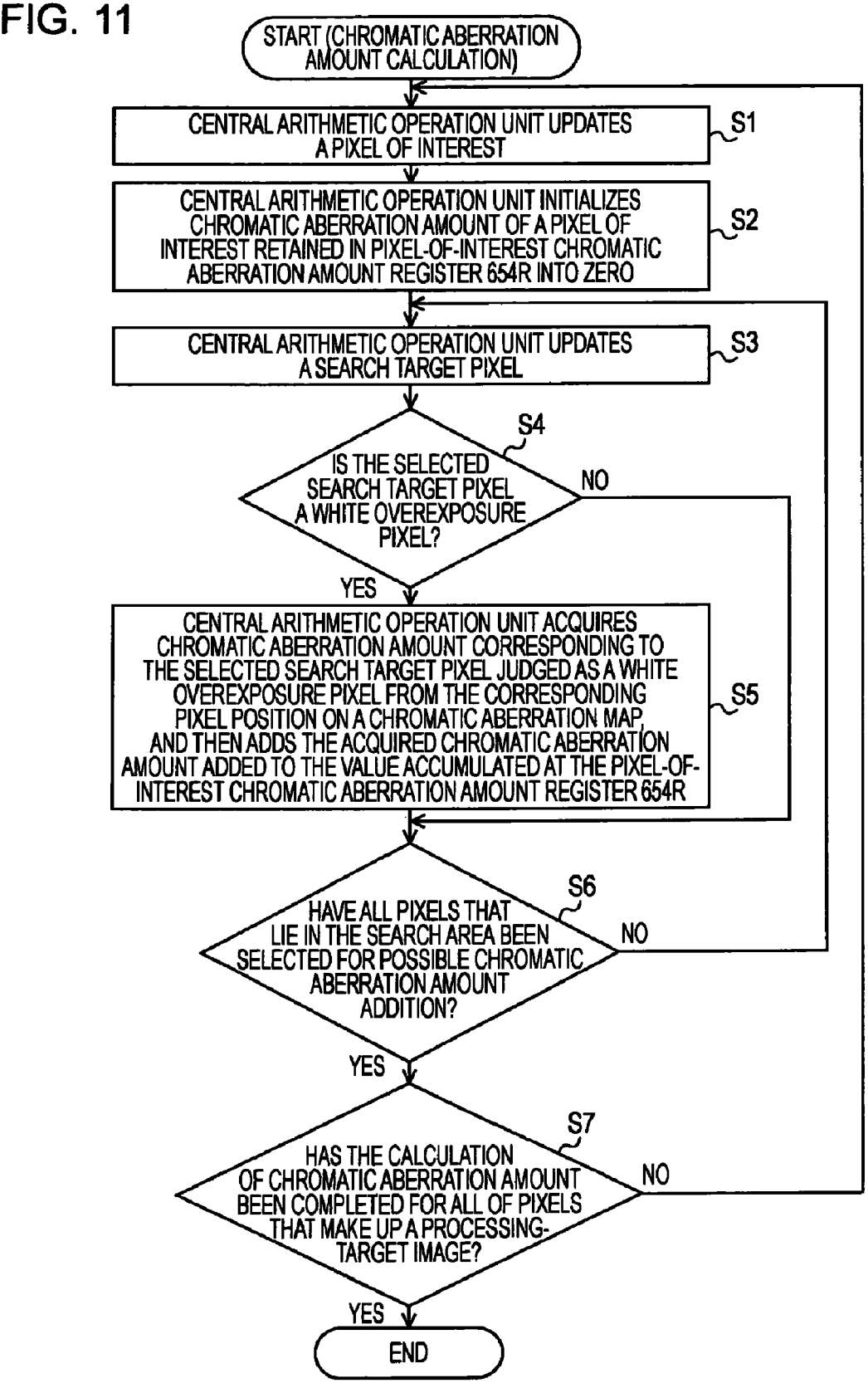
FIG. 11 is a flowchart that illustrates an example of related-art processing that is performed for the calculation of chromatic aberration amount for each of all pixels that make up an image.

In the following description, an explanation is given of related-art processing that is performed by the related-art chromatic aberration amount calculation unit 654 having a configuration shown in FIG. 10 for the calculation of chromatic aberration amount for each of all pixels that make up an image. FIG. 11 is a flowchart that illustrates an example of related-art processing that is performed for the calculation of chromatic aberration amount for each of all pixels that make up an image. Note that the related-art processing shown in FIG. 11 is performed at the related-art chromatic aberration amount calculation unit 654 for each picture unit that constitutes one frame of an image.

That is, the related-art chromatic aberration amount calculation unit 654 performs a series of operations shown in the flowchart of FIG. 11 on a frame-by-frame basis. As a first step of related-art processing for the calculation of chromatic aberration amount for each of all pixels that make up an image, the central arithmetic operation unit 654C of the related-art chromatic aberration amount calculation unit 654 updates a pixel of interest, that is, selects one pixel of interest, on the white overexposure map that is stored in the white overexposure map memory 654WM (step S1). Typically, the updating of a pixel of interest in the step S1 is performed in a sequential manner in a predetermined order. For example, the scan-target pixel is shifted from left to right one by one, which starts from the uppermost and leftmost pixel of an image. Upon the reaching thereof to the rightmost pixel in the current scan-target row, the operation proceeds to the next row. That is, the leftmost pixel in the next row is selected as the scan-target pixel. In this way, as a typical operation example thereof, a pixel of interest is determined (i.e., selected) in accordance with a predetermined sequential order. However, it is not necessary to perform the updating of a pixel of interest in the step S1 as described above. The scanning may start from any pixel in any direction and in any manner as long as, as a result of the scanning operation, each of all pixels making up one frame of an image has an opportunity to be scanned as a pixel of interest.

Next, the central arithmetic operation unit 654C of the related-art chromatic aberration amount calculation unit 654 initializes the value of the chromatic aberration amount of a pixel of interest that is retained in the pixel-of-interest chromatic aberration amount register 654R into zero (step S2). Then, the central arithmetic operation unit 654C updates a search target pixel, that is, selects one search target pixel, in the search area that is determined on the basis of the pixel of interest on the white overexposure map that is stored in the white overexposure map memory 654WM (step S3). Typically, the updating of a search target pixel in the step S3 is performed in a sequential manner in a predetermined order. For example, the scan-target pixel is shifted from left to right one by one, which starts from the uppermost and leftmost pixel in the search area in the neighborhood of a certain pixel of interest. Herein and hereafter, the search area in the neighborhood of a certain pixel of interest on the white overexposure map is referred to as "white overexposure search area". Upon the reaching thereof to the rightmost pixel in the current scan-target row, the operation proceeds to the next row. That is, the leftmost pixel in the next row is selected as the scan-target pixel. In this way, as a typical operation example thereof, a search target pixel is determined in accordance with a predetermined sequential order. However, it is not necessary to perform the updating of a search target pixel in the step S3 as described above. The scanning may start from any pixel in any direction and in any manner as long as, as a result of the scanning operation, each of all pixels that lie in a certain search area has an opportunity to be scanned as a search target pixel. The size of a search area is determined on the basis of the chromatic aberration map.

Next, the central arithmetic operation unit 654C of the related-art chromatic aberration amount calculation unit 654 makes a judgment as to whether the search target pixel that has been determined (i.e., selected) as a result of the updating processing thereof in the step S3 is a white overexposure pixel or not (step S4). In this step S4, the central arithmetic operation unit 654C of the related-art chromatic aberration amount calculation unit 654 judges whether the selected search target pixel is a white overexposure pixel or not on the basis of the white overexposure map that has been supplied from the white overexposure information temporary retention unit 653 and then stored in the white overexposure map memory 654WM.

Then, if it was judged that the selected search target pixel is a white overexposure pixel in the preceding step S4, the central arithmetic operation unit 654C of the related-art chromatic aberration amount calculation unit 654 performs chromatic aberration amount addition processing. In the chromatic aberration amount addition processing, the central arithmetic operation unit 654C acquires chromatic aberration amount from a certain pixel position on the chromatic aberration map for the pixel of interest, which is stored in the chromatic aberration map memory 654CM. The above-mentioned certain pixel position on the chromatic aberration map corresponds to the position of the selected search target pixel, which was judged as a white overexposure pixel. Then, the central arithmetic operation unit 654C adds the acquired chromatic aberration amount to the value accumulated at the pixel-of-interest chromatic aberration amount register 654R in order to calculate the chromatic aberration amount of the pixel of interest (step S5). On the other hand, if it was judged that the selected search target pixel is not a white overexposure pixel in the preceding step S4, the chromatic aberration amount addition processing of the step S5 is skipped. In such a case, the process moves on to the next step S6.

After the chromatic aberration amount addition processing of the step S5, or after the skipping thereof because it was judged that the selected search target pixel is not a white overexposure pixel in the step S4, the central arithmetic operation unit 654C of the related-art chromatic aberration amount calculation unit 654 makes a judgment as to whether all pixels that lie in the search area have already been selected for possible chromatic aberration amount addition or not (step S6). If it is judged in the step S6 that there are some pixel(s) in the search area that have not been selected yet, which means that the search has not been completed yet, the process returns to the step S3. As a result thereof, the next pixel in the search area is selected as a white overexposure judgment target pixel. This means that the steps S3, S4, and S5 are repeated until the series of processing explained above finishes for all pixels that are located in the search area.

On the other hand, if it is judged in the step S6 that there remains no pixel in the search area that has not been selected yet, which means that the search has been completed, the central arithmetic operation unit 654C of the related-art chromatic aberration amount calculation unit 654 makes a judgment as to whether the calculation of chromatic aberration amount has been completed for all of pixels that make up a processing-target image, which is herein an image corresponding to one frame (step S7). If it is judged in the step S7 that the calculation of chromatic aberration amount has not been completed for any of pixels that make up the processing-target image, the process returns to the step S1. Then, the calculation of chromatic aberration amount explained above is performed for the next pixel of interest. This means that the steps S1-S6 explained above are repeated until the calculation of chromatic aberration amount has been completed for all of pixels that make up the processing-target image. On the other hand, if it is judged in the step S7 that the calculation of chromatic aberration amount has been completed for all of pixels that make up the processing-target image, the operation flow illustrated in FIG. 11 ends.

FIGS. 12A, 12B, 12C, and 12D are a set of conceptual diagrams that schematically illustrates an example of processing performed for the calculation of chromatic aberration amount according to related art, the processing flow of which is explained above with reference to FIG. 11. FIG. 12 shows an exemplary case where 9×9 pixels are taken as an area of search for white overexposure pixels around a pixel of interest inclusive of the position thereof (i.e., white overexposure pixel search area).

Figures 12A, 12B, 12C, 12D:
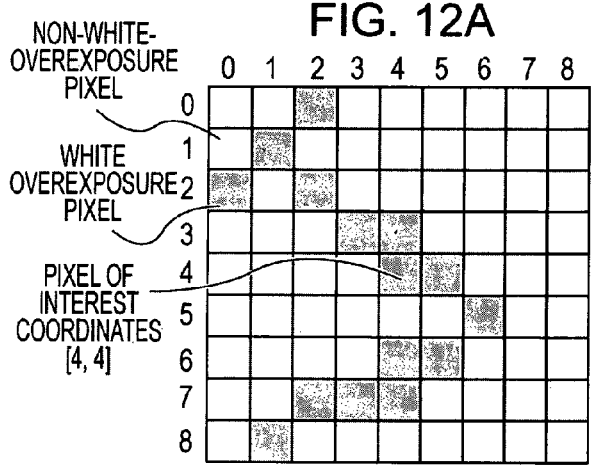
FIGS. 12A, 12B, 12C, and 12D are a set of conceptual diagrams that schematically illustrates an example of processing performed for the calculation of chromatic aberration amount according to related art.

FIG. 12A is a partial white overexposure map that is cut out of the entire white overexposure map for 9×9 pixels, which constitutes the white overexposure pixel search area at the center of which a pixel of interest is located. In FIG. 12A, each unfilled square indicates a non-white-overexposure pixel, whereas each filled square indicates a white overexposure pixel. FIG. 12B shows a chromatic aberration map that corresponds to the pixel of interest shown in FIG. 12A. Each of values that is shown as a combination of a capital alphabet and a numeral as in A4, A3, A2, . . . in FIG. 12B is chromatic aberration amount (i.e., chromatic aberration correction value) for the corresponding pixel. FIG. 12D is a partial chromatic aberration amount storage area that is cut out of the entire chromatic aberration amount storage area for 9×9 pixels to the center of which the position of the pixel of interest corresponds.

As has already been explained above while referring to FIG. 11, in the operation of the chromatic aberration amount calculation unit 654 of the related art, the central arithmetic operation unit 654C makes a judgment as to whether a selected search target pixel is a white overexposure pixel or not on the basis of the white overexposure map shown in FIG. 12A, where the selection thereof is performed one after another in the 9×9 white overexposure pixel search area around a pixel of interest. If the selected search target pixel is judged as a white overexposure pixel, the central arithmetic operation unit 654C acquires chromatic aberration amount corresponding to this white overexposure pixel from the corresponding pixel position on the chromatic aberration map shown in FIG. 12B, which is created on the basis of the pre-stored chromatic aberration model. The acquired chromatic aberration amount is then added to the value accumulated at the pixel-of-interest chromatic aberration amount register 654R for integration, that is, summation. Thereafter, the result of the integration is stored at the corresponding pixel position of the chromatic aberration amount storage area shown in FIG. 12D.

Therefore, as shown in FIG. 12C, the chromatic aberration amount S of the pixel of interest that is explained above while referring to FIG. 11, which lies at the x-y position of [4,4], can be calculated using the following formula (4).

$$\text{Chromatic Aberration Amount } S = A2+B3+C4+C2+D1+D0+E0+E1+D2+C0+C1+B2+B1+B0+A3 \quad (4)$$

The result of arithmetic operation explained above is obtained at the pixel-of-interest chromatic aberration amount register 654R shown in FIG. 10. Then, the calculation result is stored at the corresponding pixel position of the chromatic aberration amount storage area of the chromatic aberration amount storage unit 654M as shown in FIG. 12D.

The method for calculating chromatic aberration amount according to related art that is explained above with reference to FIGS. 10, 11, and 12 has a disadvantage in that the amount of calculation is substantially large as has already been mentioned earlier. For example, it is assumed herein that the number of pixels for an image of one frame is 200×150. The white overexposure search area around a pixel of interest is assumed to be made up of 9×9 pixels. It is further assumed herein that white overexposure percentage, which shows the ratio of the number of white overexposure pixels to the number of all pixels, is 10%.

Under these assumptions, the number of times of the repetitive operation of a processing loop that includes the steps S4, S5, and S6 shown in FIG. 11 equals to the number of pixels that are located in the white overexposure search area. That is, the number of repetitions of this processing loop is: 9×9=81 times. Since it is assumed herein that the white overexposure percentage is 10%, the number of times of addition (step S5) that is performed in this processing loop is: 81×0.1=8.1 times. Since the number of pixels for an image of one frame is 200×150, the number of repetitions of the processing loop that includes the steps S4, S5, and S6 shown in FIG. 11 for a frame is: 81×200×150=2,430,000 times. The number of times of chromatic aberration amount addition in this processing loop is: 8.1×200×150=243,000 times.

If a plurality of chromatic aberration maps that differ from one pixel of interest to another is used in order to perform appropriate correction with due technical consideration given also to chromatic aberration of magnification, it is not practically possible or at best difficult to take an advantage of the overlapping of a search area corresponding to one pixel and another search area corresponding to another pixel that is adjacent to the above-mentioned one pixel for the reduction of calculation amount. The reason why it is not practically possible or at best difficult to take an advantage of the overlapping of search areas between adjacent pixels for the reduction of calculation amount is that the results of calculation performed for preceding/previous pixel(s) are not available for subsequent use if chromatic aberration maps that differ from one pixel of interest to another have to be used even though there is an overlap of search areas between these adjacent pixels.

In view of the foregoing, the chromatic aberration amount calculation unit 654 of the chromatic aberration correction unit 1065 according to the present embodiment of the invention is configured so that it can substantially reduce the amount of computation, which is far smaller than that offered by the related-art processing for the calculation of the chromatic aberration amount S of a pixel of interest, which has been explained above with reference to FIGS. 10, 11, and 12. It should be noted that the chromatic aberration amount calculation unit 654 of the chromatic aberration correction unit 1065 according to the present embodiment of the invention is capable of achieving such a substantial reduction in the amount of calculation thereof even in a case where a plurality of chromatic aberration maps that differ from one pixel of interest to another is used.

Configuration and Processing for Calculating Amount of Chromatic Aberration (Present Embodiment of the Invention)

In the following description, the configuration of a chromatic aberration amount calculation unit according to the present embodiment of the invention for calculating amount of chromatic aberration and the details of processing thereof are explained.

The concept of the present invention is applicable to the chromatic aberration amount calculation unit 654, which is illustrated as a double-line block in the configuration of the chromatic aberration correction unit 1065 shown in FIG. 3. In the processing performed by the chromatic aberration amount calculation unit 654 according to the present embodiment of the invention, as one feature thereof, the aggregate number of times of arithmetic operation that is made up of the number of times of white overexposure judgment operation, that is, white overexposure comparison operation, and the number of times of chromatic aberration addition operation is significantly decreased. More specifically, the number of times of the former of these two operations is significantly decreased. By this means, it is possible to substantially reduce the load of calculation that is performed by the chromatic aberration amount calculation unit 654, thereby achieving calculation amount that is far smaller than the amount of calculation performed by the related-art chromatic aberration amount calculation unit.

FIG. 5 is a block diagram that schematically illustrates an example of the configuration of the chromatic aberration amount calculation unit 654 of the chromatic aberration correction unit 1065 of the image pickup apparatus 100 according to the present embodiment of the invention. As illustrated in FIG. 5, the chromatic aberration amount calculation unit 654 according to the present embodiment of the invention is provided with a white overexposure map memory 654WM, a chromatic aberration map memory 654CM, a chromatic aberration amount storage unit 654M, which is a chromatic aberration amount memory, and a central arithmetic operation unit 654C, which performs not only arithmetic operation but also other central processing as described in detail below. It should be particularly noted that, unlike the chromatic aberration amount calculation unit according to the related art, which is shown in FIG. 10, the chromatic aberration amount calculation unit 654 according to the present embodiment of the invention is not provided with the pixel-of-interest chromatic aberration amount register 654R.

As is the case with the chromatic aberration amount calculation unit of the related art explained above, in the configuration of the chromatic aberration amount calculation unit 654 according to the present embodiment of the invention, the white overexposure map memory 654WM, the chromatic aberration map memory 654CM, and the chromatic aberration amount storage unit 654M can be embodied as a plurality of RAMs. Or, these memories 654WM, 654CM, and 654M may be provided in a single RAM. In the latter case, they are provided in a plurality of memory areas different from one another in the same single RAM. The central arithmetic operation unit 654C may be provided as, for example, a dedicated CPU. Or, the aforementioned CPU 111 of the control unit 110 of the image pickup apparatus 100 may function also as the central arithmetic operation unit 654C.

In the operation of the chromatic aberration amount calculation unit 654 according to the present embodiment of the invention, which is shown in FIG. 5, the central arithmetic operation unit 654C makes a judgment as to whether a selected pixel of interest (note that it is not a selected search target pixel) is a white overexposure pixel or not on the basis of a white overexposure map that is stored in the white overexposure map memory 654WM. If the selected pixel of interest is judged as a white overexposure pixel, the central arithmetic operation unit 654C reads a chromatic aberration map that corresponds to this pixel of interest out of the chromatic aberration map memory 654CM. Then, the central arithmetic operation unit 654C adds each value contained in the read-out chromatic aberration map at the corresponding pixel position of the chromatic aberration amount storage area of the chromatic aberration amount storage unit 654M as if these values were "stamped" thereon.

As briefly explained above, if it is found that a judgment-target pixel of interest is a white overexposure pixel as a result of white overexposure judgment, each value contained in the entire chromatic aberration map for this pixel of interest is added at the corresponding pixel position of the chromatic aberration amount storage area of the chromatic aberration amount storage unit 654M, which is performed for each of all pixels that make up a frame. As a final result of such processing, it is possible to calculate chromatic aberration amount for each of all pixels that make up a frame, which is the same calculation result as that obtained by the related-art method for calculating chromatic aberration amount explained earlier. Since the chromatic aberration amount calculation unit 654 according to the present embodiment of the invention is not provided with the pixel-of-interest chromatic aberration amount register 654R, the entire image for one frame is set as a white overexposure search area without calculating chromatic aberration amount on a pixel-of-interest-by-pixel-of-interest basis. In addition, since the chromatic aberration amount calculation unit 654 according to the present embodiment of the invention is not provided with the pixel-of-interest chromatic aberration amount register 654R, an area that constitutes a white overexposure search area according to the related art does not constitute a white overexposure search area but constitute a block unit of addition processing according to the present embodiment of the invention.

Figure 6:
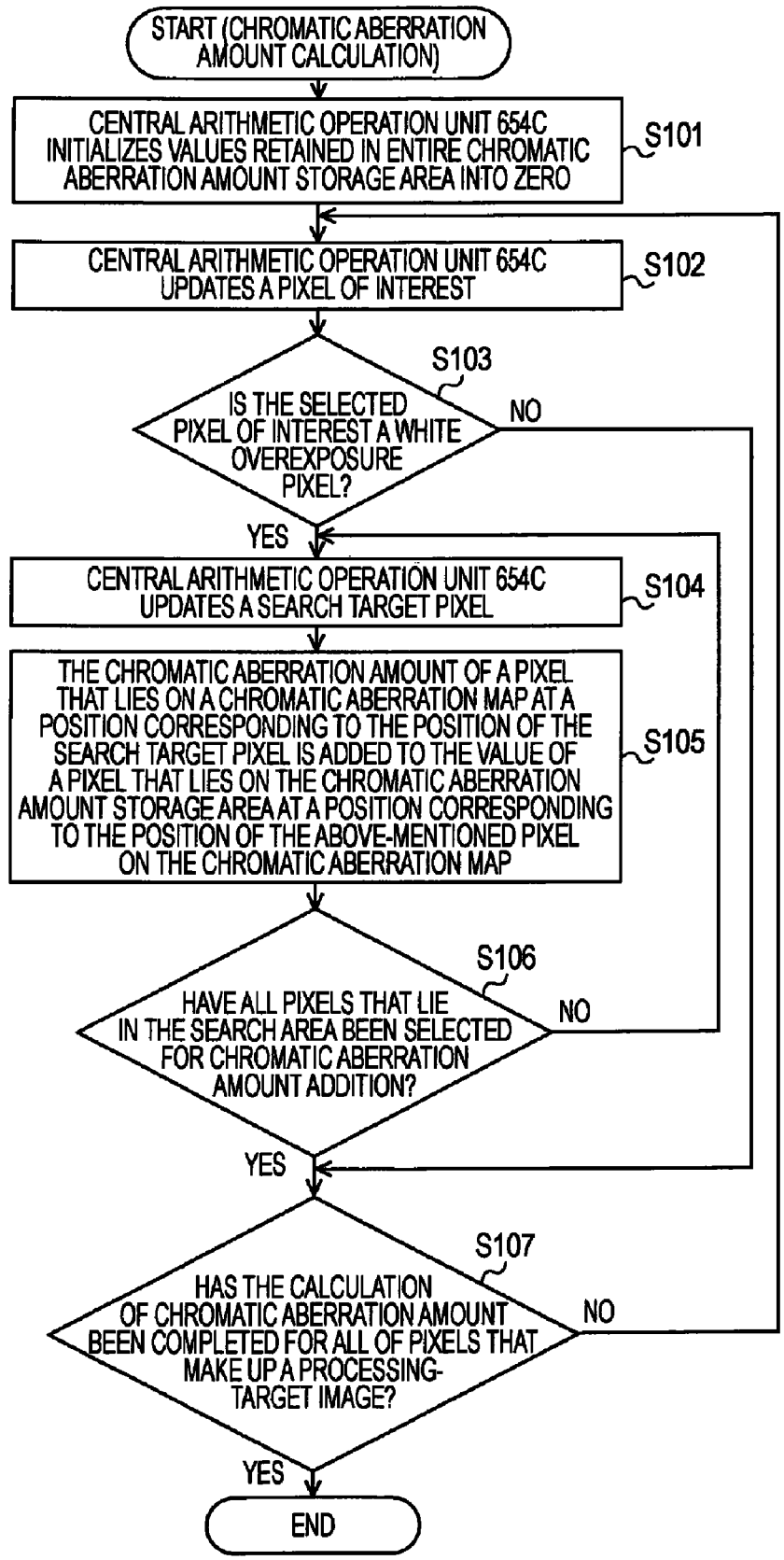
FIG. 6 is a flowchart that illustrates an example of processing performed by the chromatic aberration amount calculation unit 654 according to an exemplary embodiment of the present invention.

Next, processing performed by the chromatic aberration amount calculation unit 654 of the chromatic aberration correction unit 1065 according to the present embodiment of the invention is explained in detail below. FIG. 6 is a flowchart that illustrates an example of processing performed by the chromatic aberration amount calculation unit 654 according to the present embodiment of the invention. Note that the processing shown in FIG. 6 is performed at the chromatic aberration amount calculation unit 654 according to the present embodiment of the invention for each picture unit that constitutes one frame of an image.

That is, the chromatic aberration amount calculation unit 654 that is provided as a component unit of the image pickup apparatus 100 according to the present embodiment of the invention performs a series of operations shown in the flowchart of FIG. 6 on a frame-by-frame basis. As a first step thereof, the central arithmetic operation unit 654C of the chromatic aberration amount calculation unit 654 initializes values that are retained in the entire chromatic aberration amount storage area of the chromatic aberration amount storage unit 654M into zero (step S101). That is, the processing of the step S101 explained above is performed so as to set the entire chromatic aberration amount storage area for one frame into default values of 0.

Next, the central arithmetic operation unit 654C of the chromatic aberration amount calculation unit 654 updates a pixel of interest, that is, selects one pixel of interest, on the white overexposure map that is stored in the white overexposure map memory 654WM (step S102). Typically, the updating of a pixel of interest in the step S102 can be performed in a sequential manner in a predetermined order. For example, the scan-target pixel is shifted from left to right one by one, which starts from the uppermost and leftmost pixel of an image. Upon the reaching thereof to the rightmost pixel in the current scan-target row, the operation proceeds to the next row. That is, the leftmost pixel in the next row is selected as the scan-target pixel. In this way, as a typical operation example thereof, a pixel of interest is determined (i.e., selected) in accordance with a predetermined sequential order. However, it is not necessary to perform the updating of a pixel of interest in the step S102 as described above. The scanning may start from any pixel in any direction and in any manner as long as, as a result of the scanning operation, each of all pixels making up one frame of an image has an opportunity to be scanned as a pixel of interest.

Next, the central arithmetic operation unit 654C of the chromatic aberration amount calculation unit 654 makes a judgment as to whether the pixel of interest that has been determined (i.e., selected) as a result of the updating processing thereof in the step S102 is a white overexposure pixel or not (step S103). In this step S103, the central arithmetic operation unit 654C of the chromatic aberration amount calculation unit 654 judges whether the selected pixel of interest is a white overexposure pixel or not on the basis of the white overexposure map that has been supplied from the white overexposure information temporary retention unit 653 and then stored in the white overexposure map memory 654WM.

If the selected pixel of interest is judged as a white overexposure pixel in the step S103, the central arithmetic operation unit 654C reads a chromatic aberration map that corresponds to this pixel of interest out of the chromatic aberration map memory 654CM. Then, the central arithmetic operation unit 654C updates a search target pixel, that is, selects one search target pixel, on the read-out chromatic aberration map (step S104). Herein, the terms "search area" and "search target pixel" are consistently used as done so in the foregoing description of the related-art processing because the chromatic aberration map that is read out in the processing according to the present embodiment of the invention has the same area size as that of the search area used in the processing according to the related art. However, it should be noted that there is a difference between the search area used in the processing according to the related art and the search area used in the processing according to the present embodiment of the invention; that is, the former means a search area on the white overexposure map, whereas the latter means, as described herein, a search area on the chromatic aberration map.

Typically, the updating of a search target pixel in the step S104 can be performed in a sequential manner in a predetermined order. For example, the scan-target pixel is shifted from left to right one by one, which starts from the uppermost and leftmost pixel in the search area in the neighborhood of a certain pixel of interest. Upon the reaching thereof to the rightmost pixel in the current scan-target row, the operation proceeds to the next row. That is, the leftmost pixel in the next row is selected as the scan-target pixel. In this way, as a typical operation example thereof, a search target pixel is determined in accordance with a predetermined sequential order. However, it is not necessary to perform the updating of a search target pixel in the step S104 as described above. The scanning may start from any pixel in any direction and in any manner as long as, as a result of the scanning operation, each of all pixels that lie in a certain search area has an opportunity to be scanned as a search target pixel.

Then, the central arithmetic operation unit 654C acquires chromatic aberration amount (i.e., chromatic aberration correction value) corresponding to this search target pixel from the chromatic aberration map. Thereafter, the central arithmetic operation unit 654C adds the acquired chromatic aberration amount corresponding to this search target pixel to one pixel of the chromatic aberration amount storage area of the chromatic aberration amount storage unit 654M (step S105). The position of the above-mentioned one pixel of the chromatic aberration amount storage area to which the acquired chromatic aberration amount is added corresponds to the position of this search target pixel. The addition processing of the step S105 is performed so as to add the chromatic aberration amount of a pixel that lies on the chromatic aberration map at a position that corresponds to, that is, is determined by, the position of the search target pixel to the value of a pixel that lies on the chromatic aberration amount storage area at a position that corresponds to the position of the above-mentioned pixel on the chromatic aberration map, that is, the position of the search target pixel.

Next, the central arithmetic operation unit 654C of the chromatic aberration amount calculation unit 654 makes a judgment as to whether all pixels that lie in the search area have already been selected for chromatic aberration amount addition or not (step S106). If it is judged in the step S106 that there are some pixel(s) in the search area that have not been selected yet for chromatic aberration amount addition, which means that the "search" has not been completed yet, the process returns to the step S104. As a result thereof, the next pixel in the search area is selected as a chromatic aberration amount addition target pixel. In this way, chromatic aberration amount corresponding to each pixel that is located in the search area on the chromatic aberration map is added to a value of the corresponding one of pixels that are located in the chromatic aberration amount storage area of the chromatic aberration amount storage unit 654M. As described above, the processing loop that is made up of the steps S104, S105, and S106 is a set of operations in which a chromatic aberration correction value corresponding to each pixel that is located in the search area on the chromatic aberration map is added to a value of the corresponding one of pixels that are located in the chromatic aberration amount storage area as if these chromatic aberration correction values were stamped thereon.

If it is judged in the step S106 that there remains no pixel in the search area that has not been selected yet, which means that the search has been completed, or if it is judged in the step S103 that the selected pixel of interest is not a white overexposure pixel, the process moves on to a step S107. In the step S107, the central arithmetic operation unit 654C of the chromatic aberration amount calculation unit 654 makes a judgment as to whether the calculation of chromatic aberration amount has been completed for all of pixels that make up a processing-target image, which is herein an image corresponding to one frame (step S107).

If it is judged in the step S107 that the calculation of chromatic aberration amount has not been completed for any of pixels that make up the processing-target image, the process returns to the step S102. Then, the calculation of chromatic aberration amount explained above is performed for the next pixel of interest. This means that the steps S102-S106 explained above are repeated until the calculation of chromatic aberration amount has been completed for all of pixels that make up the processing-target image. On the other hand, if it is judged in the step S107 that the calculation of chromatic aberration amount has been completed for all of pixels that make up the processing-target image, the operation flow illustrated in FIG. 6 ends.

Each of FIGS. 7 (7A, 7B, and 7C) and 8 (8A, 8B, and 8C) is a set of conceptual diagrams that schematically illustrates an example of processing performed by the chromatic aberration amount calculation unit 654 that is provided as a component unit of the image pickup apparatus 100 according to the present embodiment of the invention for the calculation of chromatic aberration amount, the processing flow of which is explained above with reference to FIG. 6. In FIGS. 7 and 8, a search area around a pixel of interest is assumed to be made up of 9×9 pixels.

Figures 7A, 7B, 7C:
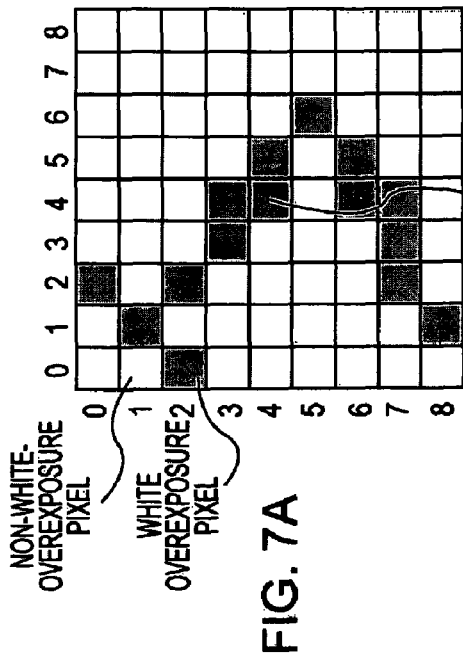
FIGS. 7A, 7B, and 7C is a set of conceptual diagrams that schematically illustrates an example of processing performed by the chromatic aberration amount calculation unit 654 according to an exemplary embodiment of the present invention for the calculation of chromatic aberration amount.

Each of FIGS. 7A and 8A is a partial white overexposure map that is cut out of the entire white overexposure map for 9×9 pixels, which constitutes a white overexposure map area at the center of which a pixel of interest is located. In each of FIGS. 7A and 8A, each unfilled square indicates a non-white-overexposure pixel, whereas each filled square indicates a white overexposure pixel. Each of FIGS. 7B and 8B shows a chromatic aberration map that corresponds to a pixel of interest. Each of values that is shown as a combination of a capital alphabet and a numeral as in A4, A3, A2, . . . in FIG. 7B, 8B is chromatic aberration amount for the corresponding pixel. Each of FIGS. 7C and 8C is a partial chromatic aberration amount storage area that is cut out of the entire chromatic aberration amount storage area for 9×9 pixels to the center of which the position of the pixel of interest corresponds.

In the step S103 of the processing flow shown in the flowchart of FIG. 6, it is judged as to whether the selected pixel of interest is a white overexposure pixel or not on the basis of the white overexposure map shown in, for example, FIG. 7A. In the example of FIG. 7A, the pixel of interest that lies at the x-y position of [4,4] is a white overexposure pixel. Accordingly, through the steps S104 and S105 of the processing flow shown in the flowchart of FIG. 6, the chromatic aberration amount of each pixel that lies on the chromatic aberration map shown in FIG. 7B, which is created on the basis of the pre-stored chromatic aberration model, is added to the value of the corresponding pixel that lies on the chromatic aberration amount storage area shown in FIG. 7C.

That is, in the example of FIG. 7, since the pixel of interest that lies at the x-y position of [4,4] is a white overexposure pixel, each chromatic aberration correction value (i.e., chromatic aberration amount) contained in the chromatic aberration map shown in FIG. 7B is added at the corresponding pixel position of the chromatic aberration amount storage area shown in FIG. 7C as if these values were stamped thereon. Therefore, in the example of FIG. 7, the chromatic aberration amount S of this pixel of interest, which lies at the x-y position of [4,4], is expressed at this moment as in the following formula (5).

$$S=E0 \tag{5}$$

Subsequent to chromatic aberration amount addition shown in FIG. 7, the central arithmetic operation unit 654C of the chromatic aberration amount calculation unit 654 updates a pixel of interest in the step S102 shown in the flowchart of FIG. 6. FIG. 8 shows an exemplary operation state in which the next pixel of interest has been selected after the chromatic aberration amount addition shown in FIG. 7; and as a result thereof, the pixel of interest has shifted from the coordinates [4,4] to the coordinates [5,4], as shown in FIG. 8A.

In the example of FIG. 8, the current pixel of interest that lies at the x-y position of [5,4] is judged as a white overexposure pixel on the basis of the white overexposure map shown in FIG. 8A, which is the same judgment result as that of the white overexposure judgment performed for the preceding pixel of interest that lies at the x-y position of [4,4] shown in FIG. 7. Accordingly, through the steps S104-S106 of the processing flow shown in the flowchart of FIG. 6, the chromatic aberration amount of each pixel that lies on the chromatic aberration map shown in FIG. 8B is added to the value of the corresponding pixel that lies on the chromatic aberration amount storage area shown in FIG. 8C as done for the preceding pixel of interest that lies at the x-y position of [4,4] shown in FIG. 7. Herein, for the purpose of explanation, our attention is focused on the first-mentioned pixel of interest that lies at the x-y position of [4,4]. Through the chromatic aberration amount addition processing shown in FIG. 7, the chromatic aberration amount E0 is added to the value of a pixel that lies on the chromatic aberration amount storage area shown in FIG. 7C at the position corresponding to the first-mentioned x-y position of [4,4]. Next, through the chromatic aberration amount addition processing shown in FIG. 8, the chromatic aberration amount E1 is added to the value of the pixel that lies on the chromatic aberration amount storage area shown in FIG. 8C at the position corresponding to the first-mentioned x-y position of [4,4].

Therefore, if the processing of FIG. 8 is performed after the processing of FIG. 7 in a sequential manner, the chromatic aberration amount S that is obtained at this moment at the above-mentioned pixel that lies on the chromatic aberration amount storage area at the position corresponding to the x-y position [4,4] of the first-mentioned pixel of interest is expressed as in the following formula (6).

$$S = E0 + E1 \qquad (6)$$

In a similar fashion, it is assumed herein that a pixel of interest is shifted from the upper left x-y position of [0,0] to the lower right x-y position of [8,8] one by one, that is, one after another. If the selected pixel of interest is a white overexposure pixel, chromatic aberration amount on the chromatic aberration map is added to the chromatic aberration amount storage area. As a final result of such sequential addition, the chromatic aberration amount S that is obtained at the above-mentioned pixel that lies on the chromatic aberration amount storage area at the position corresponding to the x-y position [4,4] of the first-mentioned pixel of interest is expressed as in the following formula (7).

Chromatic Aberration Amount $S$ at Coordinates [4,4]
$$= A2+B3+C4+C2+D1+D0+E0+E1+D2+C0+C1+B2+B1+B0+A3 \qquad (7)$$

That is, it is possible to obtain the same calculation result of the chromatic aberration amount S at the x-y position [4,4] as that obtained with the use of a method for calculating chromatic aberration amount according to the related art explained earlier with reference to FIGS. 10, 11, and 12.

Comparison Between Processing of Related Art and Processing of Present Embodiment of the Invention In the following description, chromatic aberration amount calculation processing of the related art (refer to FIG. 11) and chromatic aberration amount calculation processing according to the present embodiment of the invention (refer to FIG. 6), both of which is performed by the chromatic aberration amount calculation unit 654, are compared with each other. In the chromatic aberration amount calculation processing of the related art shown in FIG. 11, through the steps S3-S6 thereof, if each selected search target pixel is judged as a white overexposure pixel, chromatic aberration amount is acquired from the corresponding position on the chromatic aberration map; then, the acquired chromatic aberration amount is added to the value accumulated at the pixel-of-interest chromatic aberration amount register 654R for integration, that is, summation, in order to calculate the chromatic aberration amount of one pixel of interest; thereafter, the result of the integration is stored at a pixel position of the chromatic aberration amount storage area corresponding to the pixel position of a pixel of interest.

In contrast, in the chromatic aberration amount calculation processing according to the present embodiment of the invention shown in FIG. 6, through the steps S103-S106 thereof, chromatic aberration amount corresponding to each pixel that is located in the search area on the chromatic aberration map is added to a value of the corresponding one of pixels that are located in the chromatic aberration amount storage area only if the selected pixel of interest is judged as a white overexposure pixel.

Therefore, in the chromatic aberration amount calculation processing according to the present embodiment of the invention shown in FIG. 6, the chromatic aberration amount of a certain pixel of interest is not obtained as a final calculation result through a single execution of a set of operations shown as the steps S104-S106 in the flowchart of FIG. 6. However, through the execution of a set of operations shown as the steps S104-S106 for all pixels located in the search area, chromatic aberration correction values for these pixels located therein are integrated for the calculation of the chromatic aberration amount of the selected pixel of interest if the selected pixel of interest was judged as a white overexposure pixel in the preceding step S103. Therefore, it is possible to obtain the same final calculation result as that obtained through the execution of a set of operations shown as the steps S3-S6 in the flowchart of FIG. 11, which shows a method for calculating chromatic aberration amount according to the related art explained earlier.

For the purpose of comparison, it is assumed herein that the number of pixels for an image of one frame is, for example, 200×150. The chromatic aberration amount search area around a pixel of interest is assumed to be made up of 9×9 pixels. It is further assumed herein that white overexposure percentage, which shows the ratio of the number of white overexposure pixels to the number of all pixels, is 10%. Under these assumptions, the number of times of arithmetic operation performed by the chromatic aberration amount calculation unit 654 of the chromatic aberration correction unit 1065 of the image pickup apparatus 100 according to the present embodiment of the invention is derived as follows. Since it suffices to make one white overexposure judgment for each of pixels that make up a frame, the number of times of white overexposure judgment operation, that is, white overexposure comparison operation, is: 1×200×150=30,000 times.

Under the same assumptions as above, as has already been explained above while referring to the flowchart of FIG. 6, it is necessary to add chromatic aberration amount corresponding to each pixel that is located in a search area on a chromatic aberration map to a value of the corresponding one of pixels that are located in the chromatic aberration amount storage area, which is performed for each white overexposure pixel of interest, that is, each pixel of interest that is judged as a white overexposure pixel, for the calculation of chromatic aberration amount for an image of one frame. Thus, the number of times of chromatic aberration addition operation that should be executed for the calculation of chromatic aberration amount for an image of one frame is: 9×9×200×150×0.1=243,000 times. In the equation shown above, "9×9" indicates the number of pixels that are located in the search area, whereas "200×150" indicates the number of pixels for an image of one frame. As explained above, "0.1" indicates the white overexposure percentage.

Under the mathematical conditions defined above, which apply to both of the processing according to the present embodiment of the invention, which is illustrated in FIG. 6, and the processing according to the related art, which is illustrated in FIG. 11, the number of times of arithmetic operation performed for an image of one frame under the processing according to the present embodiment of the invention is compared herein with the number of times of arithmetic operation performed for an image of one frame under the processing according to the related art.

The number of times of arithmetic operation performed for an image of one frame under the processing according to the present embodiment of the invention (refer to FIG. 6) is as follows.

Number of Times of White Overexposure Judgment Operation: 1×200×150=30,000 times Number of Times of Chromatic Aberration Addition Operation for Calculation of Chromatic Aberration Amount: 9×9×200×150×0.1=243,000 times On the other hand, the number of times of arithmetic operation performed for an image of one frame under the processing according to the related art (refer to FIG. 11) is as follows.

Number of Times of White Overexposure Judgment Operation: 9×9×200×150=2,430,000 times Number of Times of Chromatic Aberration Addition Operation for Calculation of Chromatic Aberration Amount: 9×9×200×150×0.1=243,000 times As understood from the comparison shown above, although the number of times of chromatic aberration addition operation that should be executed for the calculation of chromatic aberration amount for an image of one frame under the processing according to the present embodiment of the invention is the same as that of the related art, the processing according to the present embodiment of the invention makes it possible to reduce the number of times of white overexposure judgment operation to one eighty-first (1/81) of that of the related art.

Figure 9:
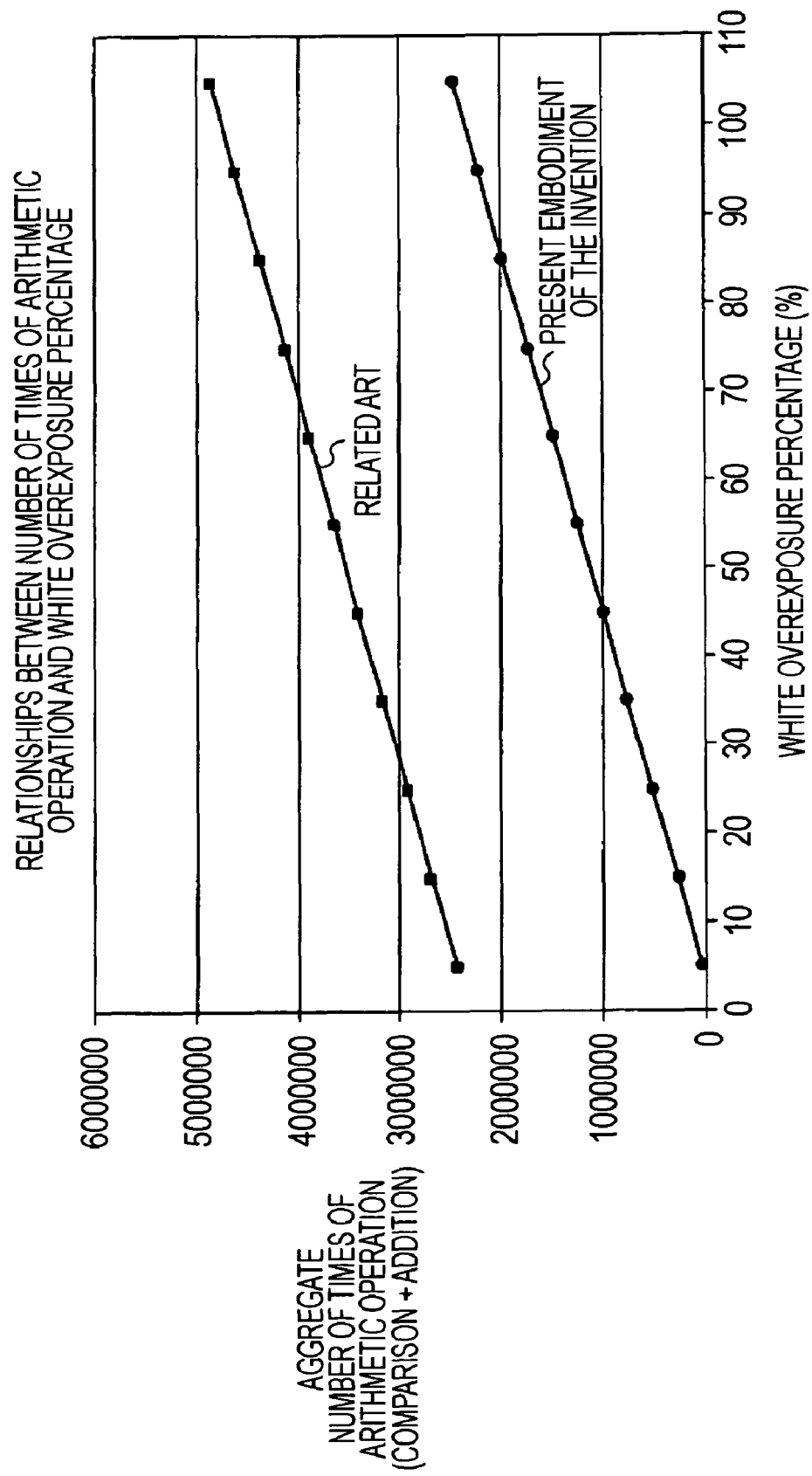
FIG. 9 is a graph that shows, as a comparative plot example, the number of times of arithmetic operation performed under processing according to the related art and the number of times of arithmetic operation performed under processing according to an exemplary embodiment of the present invention when white overexposure percentage is changed within a range from 0% to 100%.

FIG. 9 is a graph that shows, as a comparative plot example, the number of times of arithmetic operation performed under the processing according to the related art (refer to FIG. 11) and the number of times of arithmetic operation performed under the processing according to the present embodiment of the invention (refer to FIG. 6) when the white overexposure percentage, which is one of the mathematical conditions defined above, is changed within a range from 0% to 100%. The horizontal axis of FIG. 9 represents white overexposure percentage, whereas the vertical axis thereof represents the aggregate number of times of arithmetic operation that is made up of the number of times of white overexposure judgment operation, that is, white overexposure comparison operation, and the number of times of chromatic aberration addition operation executed for the calculation of chromatic aberration amount.

As understood from the graph of FIG. 9, the processing according to the present embodiment of the invention, which has been explained above while referring to FIG. 6, achieves a far smaller number of times of arithmetic operation irrespective of the white overexposure percentage. Thus, it is understood therefrom that the processing according to the present embodiment of the invention, which has been explained above while referring to FIG. 6, has an advantage over the processing according to the related art, which has been explained above while referring to FIG. 11, in terms of the reduced number of times of arithmetic operation regardless of the white overexposure percentage.

In the foregoing description of an exemplary embodiment of the present invention as well as the foregoing description of the related art, it is assumed that a search area around a pixel of interest is made up of 9×9 pixels as one operation condition. However, the pixel size of the search area is not limited thereto. If the pixel size thereof is made larger than an exemplary size of 9×9 described above, such as 11×11 or 13×13, it is possible to produce greater arithmetic operation reduction effects.

Because of the decreased number of times of white overexposure judgment operation, it is possible to reduce the load of processing performed in a circuit or program, or to make the size of the circuit smaller.

Remarks

In the configuration of the chromatic aberration amount calculation unit 654, which has been explained above while referring to FIG. 5, the white overexposure map memory 654WM constitutes a non-limiting example of, or corresponds to as a non-limiting example of, a "white overexposure distribution information memory" according to an embodiment of the present invention, which memorizes, stores, and/or retains a white overexposure map as a non-limiting example of white overexposure pixel distribution information. In addition, the chromatic aberration map memory 654CM constitutes a non-limiting example of, or corresponds to as a non-limiting example of, a "chromatic aberration distribution information memory" according to an embodiment of the present invention, which memorizes, stores, and/or retains a chromatic aberration map as a non-limiting example of chromatic aberration distribution information. In such a configuration, the chromatic aberration amount storage unit 654M constitutes a non-limiting example of, or corresponds to as a non-limiting example of, a "chromatic aberration amount memory" according to an embodiment of the present invention, which stores chromatic aberration amount for each pixel. Or, the white overexposure map memory 654WM, the chromatic aberration map memory 654CM, and the chromatic aberration amount storage unit 654M inclusive of their equivalents correspond to a "white overexposure distribution information memorizing means", a "chromatic aberration distribution information memorizing means", and a "chromatic aberration amount storing means" according to an embodiment of the present invention, respectively.

Moreover, in the configuration of the chromatic aberration amount calculation unit 654, the central arithmetic operation unit 654C shown in FIG. 5 embodies, as a non-limiting example thereof, the function of each of a "judgment unit", a "reader", and an "adder" according to an embodiment of the present invention. Or, the central arithmetic operation unit 654C, including its equivalents, corresponds to a combination of a "judging means", a "reading means", and an "adding means" according to an embodiment of the present invention. The central arithmetic operation unit 654C is, for example, a microcomputer that is provided with a CPU, a ROM, a RAM, and the like. Although it is explained that the central arithmetic operation unit 654C is provided as a component block of the chromatic aberration amount calculation unit 654 of the chromatic aberration correction unit 1065 in the foregoing description of an exemplary embodiment of the invention, it is not limited thereto. The central arithmetic operation unit 654C may be provided as, for example, an external unit so as to embody the functions of the chromatic aberration correction unit 1065. Or, a part of the aforementioned control unit 110 of the image pickup apparatus 100 shown in FIG. 1 may function also as the central arithmetic operation unit 654C. That is, the control unit 110 may perform the functions of, in addition to the functions of its own, the camera signal processing unit 106, the chromatic aberration correction unit 1065, and/or the chromatic aberration amount calculation unit 654.

As has been explained above while referring to FIG. 6, the central arithmetic operation unit 654C of the chromatic aberration amount calculation unit 654, including its equivalents, functions as a judging means according to an embodiment of the present invention so as to make a judgment as to whether the selected pixel of interest is a white overexposure pixel or not on the basis of the white overexposure map that has been stored in the white overexposure map memory 654WM. Such a white overexposure judgment is made for each of pixels that make up an image. Then, the central arithmetic operation unit 654C of the chromatic aberration amount calculation unit 654, including its equivalents, functions as a reading means according to an embodiment of the present invention so as to read, out of the chromatic aberration map memory 654CM, a chromatic aberration map having a predetermined size that corresponds to a search area for the pixel of interest that was judged as a white overexposure pixel. Thereafter, the central arithmetic operation unit 654C of the chromatic aberration amount calculation unit 654, including its equivalents, functions as an adding means according to an embodiment of the present invention so as to add each chromatic aberration amount contained therein to a value retained at the corresponding pixel position in the chromatic aberration amount storage area of the chromatic aberration amount storage unit 654M. In this way, it is possible to implement a chromatic aberration amount calculation method according to an exemplary embodiment of the invention.

In like manner, when a micro computer embodies the functions of the central arithmetic operation unit 654C of the chromatic aberration amount calculation unit 654, as has been explained above while referring to FIG. 6, the computer makes a judgment as to whether the selected pixel of interest is a white overexposure pixel or not on the basis of the white overexposure map that has been stored in the white overexposure map memory 654WM. Such a white overexposure judgment is made for each of pixels that make up an image. Then, the computer reads, out of the chromatic aberration map memory 654CM, a chromatic aberration map having a predetermined size that corresponds to a search area for the pixel of interest that was judged as a white overexposure pixel. Thereafter, the computer adds each chromatic aberration amount contained therein to a value retained at the corresponding pixel position in the chromatic aberration amount storage area of the chromatic aberration amount storage unit 654M. In this way, it is possible to implement a chromatic aberration amount calculation program according to an exemplary embodiment of the invention. That is, in the implementation of such a chromatic aberration amount calculation program, the computer itself functions as a judging means, a reading means, and an adding means according to an embodiment of the present invention.

The chromatic aberration correction unit 1065 according to the foregoing exemplary embodiment of the invention, which is shown in FIG. 3, may be further provided with a chromaticity calculation unit. The chromaticity calculation unit calculates the chromaticity of each pixel, which indicates colorfulness and hue for each pixel, on the basis of the chrominance signals of image data. In such a modified configuration example, chromatic aberration amount calculated by the chromatic aberration amount calculation unit 654 is multiplied by chromaticity outputted from the chromaticity calculation unit. Then, the chromatic aberration correction of image data is performed with the use of the result of multiplication. With such a modified chromatic aberration correction, it is possible to perform chromatic aberration correction more correctly with due technical consideration given also to chromaticity.

As has been explained earlier, for the purpose of performing effective correction also on chromatic aberration of magnification, a plurality of chromatic aberration maps different from one pixel of interest to another depending on the position thereof may be used as the aforementioned chromatic aberration map that is pre-stored in the chromatic aberration map memory 654CM according to the foregoing exemplary embodiment of the invention. Or, for example, several chromatic aberration maps may be prepared so as to allow the selection of appropriate one. Or, as has been explained above, an appropriate chromatic aberration map may be created on the basis of the aforementioned chromatic aberration model that has been stored in the chromatic aberration amount calculation unit 654 in advance and further on the basis of the selected pixel of interest.

In the foregoing description of an exemplary embodiment of the invention, it is explained that the concept of the present invention is applied to an image pickup apparatus. However, the scope of the present invention is not limited to such a specific example. As a modification example thereof, the chromatic aberration correction unit 1065 according to an exemplary embodiment of the invention may be embodied as an integrated circuit (IC), or a plurality of ICs. In such a modification example, the IC can be mounted on a variety of image pickup apparatuses.

In addition, as explained in detail above while referring to FIG. 6, a program that executes the illustrated operations may be installed on a variety of image pickup apparatuses. By this means, it is possible to apply the concept of the present invention thereto in the form of such a program.

In the foregoing description of an exemplary embodiment of the invention, it is explained that the image pickup apparatus 100 is a digital video camera that processes moving-picture data. In addition, it is further explained therein that chromatic aberration correction is performed for each image corresponding to one frame. However, the scope of the present invention is not limited to such a specific example. For example, the present invention is also applicable to a digital still camera. That is, even when the concept of the present invention is applied to a digital still camera or any other non-moving-image processing apparatus, it is possible to perform chromatic aberration correction for still-picture data for each still image just in the same manner as explained above or at least in a similar way.

Furthermore, the present invention can be flexibly applied to various uses regardless of the number of pixels of an image or other similar factors. That is, the invention is applicable to a wide range of chromatic aberration correction uses for processing images having various sizes and thus number of pixels.

As explained in detail above, as an advantage of some embodiments of the invention, it is possible to calculate chromatic aberration amount, which is computed for each of all pixels that make up an image, with substantially reduced number of times of arithmetic operation speedily and accurately, thereby making it possible to perform correction for chromatic aberration in an effective manner.

It should be understood by those skilled in the art that various modifications, combinations, sub-combinations and alterations may occur depending on design requirements and other factors insofar as they are within the scope of the appended claims or the equivalents thereof.

What is claimed is:

1. A chromatic aberration correction apparatus that identifies a purple area part of an image on the basis of chrominance signals of image data and further identifies white overexposure pixels each of which has a luminance value indicating saturation on the basis of a luminance signal of the image data so as to perform chromatic aberration correction while regarding a purple area part that appears in the periphery of a white overexposure pixel as an area part affected by chromatic aberration, the chromatic aberration correction apparatus comprising:

a white overexposure information temporary retaining section that temporarily stores the result of a white overexposure judgment made for each pixel;

a chromatic aberration amount calculating section that calculates chromatic aberration amount for each of pixels that make up an image with the use of white overexposure pixel distribution information supplied from the white overexposure information temporary retaining section, the white overexposure pixel distribution information indicating the distribution of the identified white overexposure pixels, and further with the use of chromatic aberration amount distribution information, which indicates the distribution of chromatic aberration amount for each of pixels located in a certain area that is determined when the above mentioned each of pixels that make up an image is selected as a judgment target pixel one by one, the chromatic aberration amount distribution information having been set for the above mentioned each of pixels that make up an image in advance; and a chromaticity calculation section for calculating a chromaticity for each of pixels that make up the image, the chromatic aberration amount for each of the pixels that make up the image being multiplied by the respective chromaticity to generate a modified chromatic aberration amount, and the modified chromatic aberration amount being used to perform respective chromatic aberration correction, the chromatic aberration amount calculating section including a white overexposure distribution information memory that holds the white overexposure pixel distribution information, a chromatic aberration distribution information memory that holds the chromatic aberration amount distribution information, a chromatic aberration amount memory that stores chromatic aberration amount for the above mentioned each of pixels that make up an image, a judgment unit that judges whether a selected pixel of interest is a white overexposure pixel or not on the basis of the white overexposure pixel distribution information that is held in the white overexposure distribution information memory, a white overexposure pixel judgment being made for the above mentioned each of pixels that make up an image, a reader that reads, for each selected pixel of interest that is judged as a white overexposure pixel by the judgment unit, the chromatic aberration amount distribution information for a certain area that is determined on the basis of the selected pixel of interest out of the chromatic aberration distribution information memory, and an adder that adds each chromatic aberration amount contained in the chromatic aberration amount distribution information that is read by the reader to a value of the corresponding position in the storage area of the chromatic aberration amount memory.

2. The chromatic aberration correction apparatus according to claim 1, wherein the chromatic aberration amount distribution information that is held at the chromatic aberration distribution information memory is set in accordance with the position within the image of a pixel of interest for which chromatic aberration correction should be performed so that chromatic aberration of magnification can be corrected.

3. A chromatic aberration correction apparatus that identifies a purple area part of an image on the basis of chrominance signals of image data and further identifies white overexposure pixels each of which has a luminance value indicating saturation on the basis of a luminance signal of the image data so as to perform chromatic aberration correction while regarding a purple area part that appears in the periphery of a white overexposure pixel as an area part affected by chromatic aberration, the chromatic aberration correction apparatus comprising:

a white overexposure information temporary retaining section that temporarily stores the result of a white overexposure judgment made for each pixel;

a chromatic aberration amount calculating section that calculates chromatic aberration amount for each of pixels that make up an image with the use of white overexposure pixel distribution information supplied from the white overexposure information temporary retaining section, the white overexposure pixel distribution information indicating the distribution of the identified white overexposure pixels, and further with the use of chromatic aberration amount distribution information, which indicates the distribution of chromatic aberration amount for each of pixels located in a certain area that is determined when the above mentioned each of pixels that make up an image is selected as a judgment target pixel one by one, the chromatic aberration amount distribution information having been set for the above mentioned each of pixels that make up an image in advance; and a chromaticity calculation section for calculating a chromaticity for each of pixels that make up the image, the chromatic aberration amount for each of the pixels that make up the image being multiplied by the respective chromaticity to generate a modified chromatic aberration amount, and the modified chromatic aberration amount being used to perform respective chromatic aberration correction, the chromatic aberration amount calculating section including a white overexposure distribution information memory that holds the white overexposure pixel distribution information, a chromatic aberration distribution information memory that holds the chromatic aberration amount distribution information, a chromatic aberration amount memory that stores chromatic aberration amount for the above mentioned each of pixels that make up an image, a judgment unit that judges whether a selected pixel of interest is a white overexposure pixel or not on the basis of the white overexposure pixel distribution information that is held in the white overexposure distribution information memory, a white overexposure pixel judgment being made for the above mentioned each of pixels that make up an image, a reader that reads, for each selected pixel of interest that is judged as a white overexposure pixel by the judgment unit, the chromatic aberration amount distribution information for a certain area that is determined on the basis of the selected pixel of interest out of the chromatic aberration distribution information memory, and an adder that stamps the entire chromatic aberration amount distribution information that is read by the reader on the corresponding storage area of the chromatic aberration amount memory through addition processing.

4. An image pickup apparatus comprising:

an image pickup device;

a lens for forming an image of an object of shooting on the imaging surface of the image pickup device;

a chromatic aberration correcting section that identifies a purple area part of an image on the basis of chrominance signals of image data that is acquired through the image pickup device and further identifies white overexposure pixels each of which has a luminance value indicating saturation on the basis of a luminance signal of the image data so as to perform chromatic aberration correction while regarding a purple area part that appears in the periphery of a white overexposure pixel as an area part affected by chromatic aberration; and a chromaticity calculation section for calculating a chromaticity for each of pixels that make up the image, the chromatic aberration amount for each of the pixels that make up the image being multiplied by the respective chromaticity to generate a modified chromatic aberration amount, and the modified chromatic aberration amount being used to perform respective chromatic aberration correction, the chromatic aberration correcting section including a white overexposure information temporary retaining section that temporarily stores the result of a white overexposure judgment made for each pixel, and a chromatic aberration amount calculating section that calculates chromatic aberration amount for each of pixels that make up an image with the use of white overexposure pixel distribution information, which indicates the distribution of the identified white overexposure pixels, and further with the use of chromatic aberration amount distribution information, which indicates the distribution of chromatic aberration amount for each of pixels located in a certain area that is determined when the above mentioned each of pixels that make up an image is selected as a judgment target pixel one by one, the chromatic aberration amount distribution information having been set for the above mentioned each of pixels that make up an image in advance, the chromatic aberration amount calculating section including a white overexposure distribution information memory that holds the white overexposure pixel distribution information, a chromatic aberration distribution information memory that holds the chromatic aberration amount distribution information, a chromatic aberration amount memory that stores chromatic aberration amount for the above mentioned each of pixels that make up an image, a judgment unit that judges whether a selected pixel of interest is a white overexposure pixel or not on the basis of the white overexposure pixel distribution information that is held in the white overexposure distribution information memory, a white overexposure pixel judgment being made for the above mentioned each of pixels that make up an image, a reader that reads, for each selected pixel of interest that is judged as a white overexposure pixel by the judgment unit, the chromatic aberration amount distribution information for a certain area that is determined on the basis of the selected pixel of interest out of the chromatic aberration distribution information memory, and an adder that adds each chromatic aberration amount contained in the chromatic aberration amount distribution information that is read by the reader to a value of the corresponding position in the storage area of the chromatic aberration amount memory.

5. The image pickup apparatus according to claim 4, wherein the chromatic aberration amount distribution information that is held at the chromatic aberration distribution information memory is set in accordance with the position within the image of a pixel of interest for which chromatic aberration correction should be performed so that chromatic aberration of magnification can be corrected.

6. A chromatic aberration amount calculation method that is used by a chromatic aberration correction apparatus that identifies a purple area part of an image on the basis of chrominance signals of image data and further identifies white overexposure pixels each of which has a luminance value indicating saturation on the basis of a luminance signal of the image data so as to perform chromatic aberration correction while regarding a purple area part that appears in the periphery of a white overexposure pixel as an area part affected by chromatic aberration, the chromatic aberration correction apparatus having a white overexposure information temporary retaining section that temporarily stores the result of a white overexposure judgment made for each pixel and a chromatic aberration amount calculating section that calculates chromatic aberration amount for each of pixels that make up an image with the use of white overexposure pixel distribution information supplied from the white overexposure information temporary retaining section, the white overexposure pixel distribution information indicating the distribution of the identified white overexposure pixels, and further with the use of chromatic aberration amount distribution information, which indicates the distribution of chromatic aberration amount for each of pixels located in a certain area that is determined when the above mentioned each of pixels that make up an image is selected as a judgment target pixel one by one, the chromatic aberration amount distribution information having been set for the above mentioned each of pixels that make up an image in advance, and a chromaticity calculation section for calculating a chromaticity for each of pixels that make up the image, the chromatic aberration amount for each of the pixels that make up the image being multiplied by the respective chromaticity to generate a modified chromatic aberration amount, and the modified chromatic aberration amount being used to perform respective chromatic aberration correction, the chromatic aberration amount calculating section of the chromatic aberration correction apparatus including a white overexposure distribution information memorizing means for holding the white overexposure pixel distribution information, a chromatic aberration distribution information memorizing means for holding the chromatic aberration amount distribution information, a chromatic aberration amount storing means for storing chromatic aberration amount for the above mentioned each of pixels that make up an image, a judging means for judging whether a judgment target pixel is a white overexposure pixel or not, a reading means for reading the chromatic aberration amount distribution information out of the chromatic aberration distribution information memorizing means, and an adding means that performs chromatic aberration amount addition processing, the chromatic aberration amount calculation method performed by the chromatic aberration amount calculating section of the chromatic aberration correction apparatus comprising the steps of:

judging, by the judging means, whether a selected pixel of interest is a white overexposure pixel or not on the basis of the white overexposure pixel distribution information that is held in the white overexposure distribution information memorizing means, a white overexposure pixel judgment being made for the above mentioned each of pixels that make up an image;

reading, by the reading means, for each selected pixel of interest that is judged as a white overexposure pixel in the judgment operation performed by the judging means, the chromatic aberration amount distribution information for a certain area that is determined on the basis of the selected pixel of interest out of the chromatic aberration distribution information memorizing means; and adding, by the adding means, each chromatic aberration amount contained in the chromatic aberration amount distribution information that is read in the readout operation performed by the reading means to a value of the corresponding position in the storage area of the chromatic aberration amount storing means.

7. The chromatic aberration amount calculation method according to claim 6, wherein the chromatic aberration amount distribution information that is held at the chromatic aberration distribution information memorizing means is set in accordance with the position within the image of a pixel of interest for which chromatic aberration correction should be performed so that chromatic aberration of magnification can be corrected.

8. A chromatic aberration amount calculation program that is executed by a computer mounted on an image pickup apparatus for, when chromatic aberration correction is performed while regarding a purple area part that appears in the periphery of a white overexposure pixel as an area part affected by chromatic aberration by identifying a purple area part of an image on the basis of chrominance signals of image data and further by identifying white overexposure pixels each of which has a luminance value indicating saturation on the basis of a luminance signal of the image data, calculating chromatic aberration amount for each of pixels that make up an image with the use of white overexposure pixel distribution information that indicates the distribution of the identified white overexposure pixels, and further with the use of chromatic aberration amount distribution information, which indicates the distribution of chromatic aberration amount for each of pixels located in a certain area that is determined when the above mentioned each of pixels that make up an image is selected as a judgment target pixel one by one, the chromatic aberration amount distribution information having been set for the above mentioned each of pixels that make up an image in advance, the image pickup apparatus including a white overexposure distribution information memorizing means for holding the white overexposure pixel distribution information, a chromatic aberration distribution information memorizing means for holding the chromatic aberration amount distribution information, a chromatic aberration amount storing means for storing chromatic aberration amount for the above mentioned each of pixels that make up an image, a judging means for judging whether a judgment target pixel is a white overexposure pixel or not, a reading means for reading the chromatic aberration amount distribution information out of the chromatic aberration distribution information memorizing means, and an adding means that performs chromatic aberration amount addition processing, the computer mounted on the image pickup apparatus executing the steps of:

judging, by the judging means, whether a selected pixel of interest is a white overexposure pixel or not on the basis of the white overexposure pixel distribution information that is held in the white overexposure distribution information memorizing means, a white overexposure pixel judgment being made for the above mentioned each of pixels that make up an image;

reading, by the reading means, for each selected pixel of interest that is judged as a white overexposure pixel in the judgment operation performed by the judging means, the chromatic aberration amount distribution information for a certain area that is determined on the basis of the selected pixel of interest out of the chromatic aberration distribution information memorizing means;

adding, by the adding means, each chromatic aberration amount contained in the chromatic aberration amount distribution information that is read in the readout operation performed by the reading means to a value of the corresponding position in the storage area of the chromatic aberration amount storing means; and calculating, by a chromaticity calculation means, a chromaticity for each of pixels that make up the image, the chromatic aberration amount for each of the pixels that make up the image being multiplied by the respective chromaticity to generate a modified chromatic aberration amount, and the modified chromatic aberration amount being used to perform respective chromatic aberration correction.

9. The chromatic aberration amount calculation program according to claim 8, wherein the chromatic aberration amount distribution information that is held at the chromatic aberration distribution information memorizing means is set in accordance with the position within the image of a pixel of interest for which chromatic aberration correction should be performed so that chromatic aberration of magnification can be corrected.

10. A chromatic aberration correction apparatus that identifies a purple area part of an image on the basis of chrominance signals of image data and further identifies white overexposure pixels each of which has a luminance value indicating saturation on the basis of a luminance signal of the image data so as to perform chromatic aberration correction while regarding a purple area part that appears in the periphery of a white overexposure pixel as an area part affected by chromatic aberration, the chromatic aberration correction apparatus comprising:

a white overexposure information temporary retaining section that temporarily stores the result of a white overexposure judgment made for each pixel;

a chromatic aberration amount calculating section that calculates chromatic aberration amount for each of pixels that make up an image with the use of white overexposure pixel distribution information supplied from the white overexposure information temporary retaining section, the white overexposure pixel distribution information indicating the distribution of the identified white overexposure pixels, and further with the use of chromatic aberration amount distribution information, which indicates the distribution of chromatic aberration amount for each of pixels located in a certain area that is determined when the above mentioned each of pixels that make up an image is selected as a judgment target pixel one by one, the chromatic aberration amount distribution information having been set for the above mentioned each of pixels that make up an image in advance; and a chromaticity calculation section for calculating a chromaticity for each of pixels that make up the image, the chromatic aberration amount for each of the pixels that make up the image being multiplied by the respective chromaticity to generate a modified chromatic aberration amount, and the modified chromatic aberration amount being used to perform respective chromatic aberration correction, the chromatic aberration amount calculating section including a white overexposure distribution information memorizing means for holding the white overexposure pixel distribution information, a chromatic aberration distribution information memorizing means for holding the chromatic aberration amount distribution information, a chromatic aberration amount storing means for storing chromatic aberration amount for the above mentioned each of pixels that make up an image, a judging means for judging whether a selected pixel of interest is a white overexposure pixel or not on the basis of the white overexposure pixel distribution information that is held in the white overexposure distribution information memorizing means, a white overexposure pixel judgment being made for the above mentioned each of pixels that make up an image, a reading means for reading, for each selected pixel of interest that is judged as a white overexposure pixel by the judging means, the chromatic aberration amount distribution information for a certain area that is determined on the basis of the selected pixel of interest out of the chromatic aberration distribution information memorizing means, and an adding means that adds each chromatic aberration amount contained in the chromatic aberration amount distribution information that is read by the reading means to a value of the corresponding position in the storage area of the chromatic aberration amount storing means.

11. An image pickup apparatus comprising:

an image pickup device;

a lens for forming an image of an object of shooting on the imaging surface of the image pickup device; and a chromatic aberration correcting section that identifies a purple area part of an image on the basis of chrominance signals of image data that is acquired through the image pickup device and further identifies white overexposure pixels each of which has a luminance value indicating saturation on the basis of a luminance signal of the image data so as to perform chromatic aberration correction while regarding a purple area part that appears in the periphery of a white overexposure pixel as an area part affected by chromatic aberration, the chromatic aberration correcting section including a white overexposure information temporary retaining section that temporarily stores the result of a white overexposure judgment made for each pixel, and a chromatic aberration amount calculating section that calculates chromatic aberration amount for each of pixels that make up an image with the use of white overexposure pixel distribution information, which indicates the distribution of the identified white overexposure pixels, and further with the use of chromatic aberration amount distribution information, which indicates the distribution of chromatic aberration amount for each of pixels located in a certain area that is determined when the above mentioned each of pixels that make up an image is selected as a judgment target pixel one by one, the chromatic aberration amount distribution information having been set for the above mentioned each of pixels that make up an image in advance; and a chromaticity calculation section for calculating a chromaticity for each of pixels that make up the image, the chromatic aberration amount for each of the pixels that make up the image being multiplied by the respective chromaticity to generate a modified chromatic aberration amount, and the modified chromatic aberration amount being used to perform respective chromatic aberration correction, the chromatic aberration amount calculating section including a white overexposure distribution information memorizing means for holding the white overexposure pixel distribution information, a chromatic aberration distribution information memorizing means for holding the chromatic aberration amount distribution information, a chromatic aberration amount storing means for storing chromatic aberration amount for the above mentioned each of pixels that make up an image, a judging means for judging whether a selected pixel of interest is a white overexposure pixel or not on the basis of the white overexposure pixel distribution information that is held in the white overexposure distribution information memorizing means, a white overexposure pixel judgment being made for the above mentioned each of pixels that make up an image, a reading means for reading, for each selected pixel of interest that is judged as a white overexposure pixel by the judging means, the chromatic aberration amount distribution information for a certain area that is determined on the basis of the selected pixel of interest out of the chromatic aberration distribution information memorizing means, and an adding means for adding each chromatic aberration amount contained in the chromatic aberration amount distribution information that is read by the reading means to a value of the corresponding position in the storage area of the chromatic aberration amount storing means.

* * * * *